(12) United States Patent
Yamaguchi

(10) Patent No.: US 12,717,135 B2
(45) Date of Patent: Aug. 25, 2026

(54) VIRTUAL IMAGE DISPLAY DEVICE AND OPTICAL UNIT

(71) Applicant: SEIKO EPSON CORPORATION, Tokyo (JP)

(72) Inventor: Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 324 days.

(21) Appl. No.: 18/395,721

(22) Filed: Dec. 25, 2023

(65) Prior Publication Data

US 2024/0219722 A1 Jul. 4, 2024

(30) Foreign Application Priority Data

Dec. 28, 2022 (JP) ................................ 2022-212744

(51) Int. Cl.
*G02B 27/01* (2006.01)

(52) U.S. Cl.
CPC .......... *G02B 27/01* (2013.01); *G02B 27/0172* (2013.01); *G02B 2027/0178* (2013.01)

(58) Field of Classification Search
CPC ....................... G02B 27/0172; G02B 27/0178; G02B 27/01; G02B 27/02; G02B 2027/013; G02B 2027/0178
See application file for complete search history.

(56) References Cited

U.S. PATENT DOCUMENTS

| | | | | |
|---|---|---|---|---|
| 5,687,025 | A | 11/1997 | Nanba | |
| 2017/0115484 | A1* | 4/2017 | Yokoyama | G02B 27/0101 |
| 2022/0128826 | A1* | 4/2022 | Noguchi | G02B 27/0176 |
| 2022/0260840 | A1* | 8/2022 | Kessler | G06T 7/50 |

FOREIGN PATENT DOCUMENTS

| | | |
|---|---|---|
| JP | H0943536 | 2/1997 |

* cited by examiner

*Primary Examiner* — Stephone B Allen
*Assistant Examiner* — Tamara Y. Washington
(74) *Attorney, Agent, or Firm* — JCIPRNET

(57) ABSTRACT

A virtual image display device includes a first display element that is an image light generation device, a first projection optical system configured to project image light emitted from the first display element, and a first combiner disposed inclined with respect to an optical path portion of the image light emitted from the first projection optical system, the combiner including a transmissive mirror surface configured to transmit the image light. The transmissive mirror surface has a curved surface shape with identical sag amounts at effective area ends in vertical and lateral directions that are two directions orthogonal to each other.

12 Claims, 14 Drawing Sheets

VIRTUAL IMAGE DISPLAY DEVICE AND OPTICAL UNIT

The present application is based on, and claims priority from JP Application Serial Number 2022-212744, filed Dec. 28, 2022, the disclosure of which is hereby incorporated by reference herein in its entirety.

BACKGROUND

1. Technical Field

The present disclosure relates to a virtual image display device that enables observing a virtual image, and an optical unit that is a portion constituting the virtual image display device. In particular, the present disclosure relates to a virtual image display device or the like including a decentered imaging optical system.

2. Related Art

As a virtual image display device, there is known an image display device in which image light from a display element is reflected by two mirrors to be bent in a Z-shape and is incident on eyes of a user (JP-A-9-43536).

For an optical system to be incorporated in an image display device such as a head-mounted display, it is conceivable to use a mirror or a prism in order to correct aberrations with a compact configuration. However, in a case of an optical see-through type image display device enabling visual recognition of an external side, it is necessary to secure a region for visually recognizing the outside, and it is necessary to increase an effective area of an optical surface from a combiner to a light beam stop to some extent in a vertical direction. Therefore, the entire optical system is increased in size and weight.

SUMMARY

A virtual image display device according to an aspect of the present disclosure includes an image light generation device, a projection optical system configured to project image light emitted from the image light generation device, and a combiner disposed inclined with respect to an optical path of the image light emitted from the projection optical system, the combiner including a transmissive mirror surface configured to transmit the image light, wherein the transmissive mirror surface has a curved surface shape with identical sag amounts at effective area ends in two directions orthogonal to each other.

BRIEF DESCRIPTION OF THE DRAWING

FIG. 4 illustrates an optical pupil position of a first imaging optical system, a reference direction of a transmissive mirror surface, and the like.

FIG. 13 is a side cross-sectional view of a barrel, an optical member held by the barrel, and the like.

DESCRIPTION OF EMBODIMENTS

First Embodiment

Hereinafter, an embodiment of a virtual image display device according to the present disclosure will be described with reference to FIGS. 1, 2, and the like.

Figure 1:
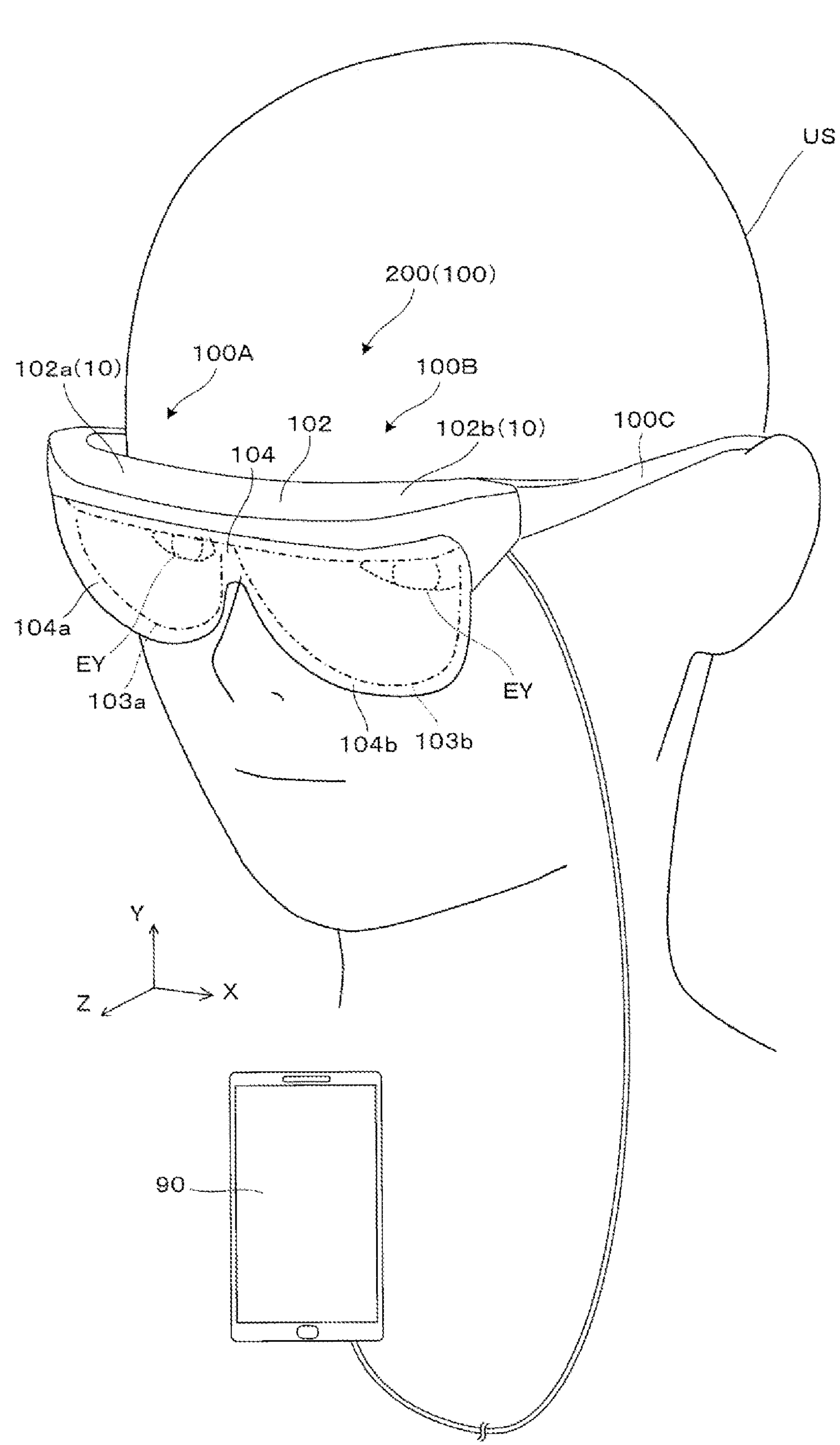
FIG. 1 is an external perspective view for explaining a mounted state of a head-mounted display device according to an embodiment.
Figure 2:
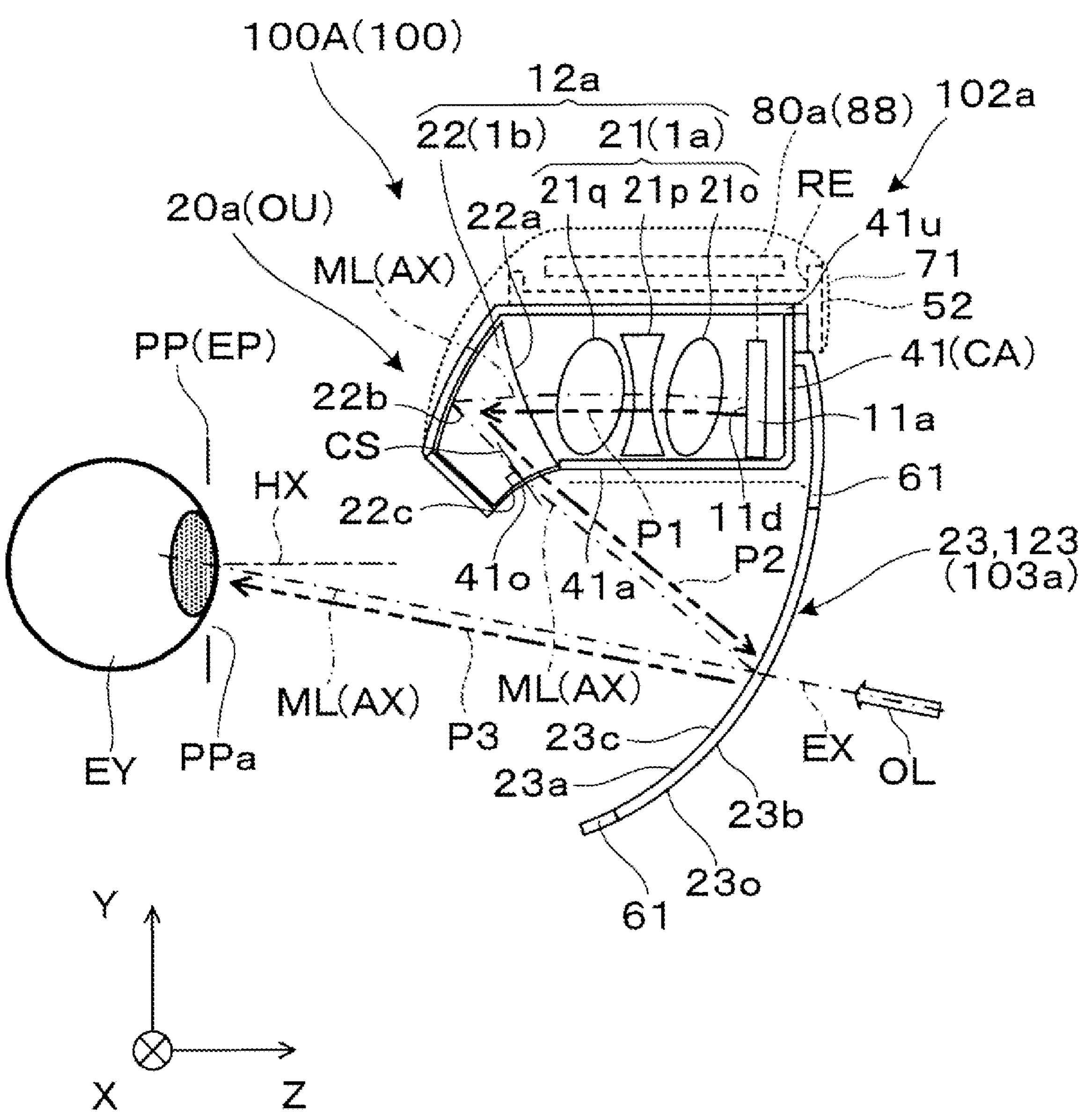
FIG. 2 is a side cross-sectional view for explaining an internal structure of a display device on one side.

FIG. 1 is a perspective view for explaining a mounted state of a head-mounted display (hereinafter also referred to as an HMD) 200 that is a virtual image display device 100, and FIG. 2 is a side cross-sectional view for explaining an internal structure of the virtual image display device 100 on one side. The HMD 200 allows an observer or a wearer US wearing the HMD 200 to recognize a video as a virtual image. In FIG. 1 and the like, X, Y, and Z indicate an orthogonal coordinate system, a +X direction corresponds to a lateral direction in which both eyes EY of the observer or wearer US wearing the HMD 200 or a virtual image display device 100 are aligned, a +Y direction corresponds to an upward direction orthogonal to the lateral direction in which both the eyes EY are aligned for the wearer US, and a +Z direction corresponds to a forward or front direction for the wearer US. The ±Y directions are parallel to the vertical axis or the vertical direction.

The HMD 200 includes a right-eye first display device 100A, a left-eye second display device 100B, a pair of temple type support devices 100C that support the display devices 100A and 100B, and a user terminal 90 as an information terminal. The first display device 100A functions independently as an image display device, and is constituted of a first display driving unit 102*a* disposed at an upper portion thereof, a first combiner 103*a* that is shaped like a spectacle lens and covers the front of the eye, and a light transmission cover 104*a* that covers the combiner 103*a* from the front. Similarly, the second display device 100B functions independently as an image display device, and is constituted of a second display driving unit 102*b* disposed at an upper portion thereof, a second combiner 103*b* that is shaped like a spectacle lens and covers the front of the eye, and a light transmission cover 104*b* that covers the combiner 103*b* from the front. The support device 100C is a mounting member that is mounted on the head of the wearer US, and supports the upper end sides of the pair of combiners 103*a* and 103*b* and the upper end sides of the pair of light transmitting covers 104*a* and 104*b* via the display driving units 102*a* and 102*b* integrated with each other in appearance. A combination of the pair of display driving units 102*a* and 102*b* is referred to as a driving device 102. A combination of the pair of light transmitting covers 104*a* and 104*b* is referred to as a shade 104.

The first display device 100A and the second display device 100B are optically identical or left-right inverted, and detailed description of the second display device 100B will be omitted.

FIG. 2 is a side cross-sectional view for explaining an internal structure of the first display device 100A. The first display device 100A includes a first display element 11*a*, a first imaging optical system 20*a*, and a first circuit member 80*a*. The first display element 11*a* is an image light generation device and is also referred to as a video element. The first imaging optical system 20*a* is an optical system that forms a virtual image and includes a projection lens 21, a prism mirror 22, and a see-through mirror 23 in an integrated state. In the first imaging optical system 20*a*, the projection lens 21 and the prism mirror 22 function as a first projection optical system 12*a* on which image light ML from the first display element 11*a* is incident, and the see-through mirror 23 functions as a partially transmissive mirror 123 that partially reflects the image light ML emitted from the above first projection optical system 12*a* toward an eye point PP or the eye EY. The projection lens 21 constituting the first projection optical system 12*a* corresponds to a first optical member 1*a* disposed on a light emission side of the first display element 11*a*, and the prism mirror 22 corresponds to a second optical member 1*b* disposed on the light emission side of the first optical member 1*a* that is the projection lens 21. Further, the first display element 11*a*, the projection lens 21, and the prism mirror 22 correspond to a part of the first display driving unit 102*a* illustrated in FIG. 1, and the see-through mirror 23 is disposed on the light emission side of the second optical member 1*b* and corresponds to the first combiner 103*a* illustrated in FIG. 1. The projection lens 21 and the prism mirror 22 constituting the first projection optical system 12*a* are fixed together with the first display element 11*a* in a container-shaped barrel 41 in a mutually positioned state. The barrel 41 is a case CA that houses the first projection optical system 12*a* in a positioned state. The first imaging optical system 20*a*, that is, a combination of the first projection optical system 12*a* and the see-through mirror 23 is particularly referred to as an optical unit OU. That is, the optical unit OU is obtained by removing, from the first display device 100A, a portion that actively performs display such as the first display element 11*a*.

The barrel 41 that supports the optical members 1*a* and 1*b* constituting the first projection optical system 12*a* is supported by a frame 52 and disposed on the lower side of the frame 52. The frame 52 is covered by a cover 71, and the barrel 41 is also entirely covered by the cover 71. The frame 52 is made of a metal material. The barrel 41 and the cover 71 are made of a light-blocking resin material, and one surface of the prism mirror 22 is exposed at an emission opening 41*o* of the barrel 41. The barrel 41 is fixed to the frame 52 in a suspended state. As a result, the first imaging optical system 20*a* is fixed in a state of being suspended from the frame 52 via the barrel 41. The frame 52 includes a recess RE on an upper side for disposing the first circuit member 80*a*.

In the first display device 100A, the first display element 11*a* is a self-luminous image light generation device. The first display element 11*a* emits the image light ML to the first projection optical system 12*a*. The barrel 41 houses and supports the first display element 11*a* together with the optical elements constituting the first projection optical system 12*a*. The first display element 11*a* is, for example, an organic electroluminescence (EL) display, and forms a color still image or a moving image on a two-dimensional display surface 11*d*. The first display element 11*a* is driven by the first circuit member 80*a*, specifically a display control device 88, to perform a display operation. The first display element 11*a* is not limited to the organic EL display, and can be replaced with a display device using an inorganic EL, an organic LED, an LED array, a laser array, a quantum dot light emission element, or the like. The first display element 11*a* is not limited to the self-luminous image light generation device, and may include an LCD and another light modulation element, and may form an image by illuminating the light modulation element with a light source such as a backlight. As the first display element 11*a*, a liquid crystal on silicon (LCOS) (LCOS is a trade name), a digital micromirror device, or the like may be used instead of the LCD.

The display control device 88 can communicate with the user terminal 90 illustrated in FIG. 1, and receives image files of moving images and still images from the user terminal 90 in accordance with commands from the user terminal 90 when controlling the operations of the first display element 11*a* and the like. One or both of the first display device 100A and the second display device 100B from which the display control device 88 is removed are also referred to as display devices 100A and 100B. That is, even a device from which a circuit portion such as the display control device 88 is removed is referred to as the HMD 200 or the virtual image display device 100.

Figure 3:
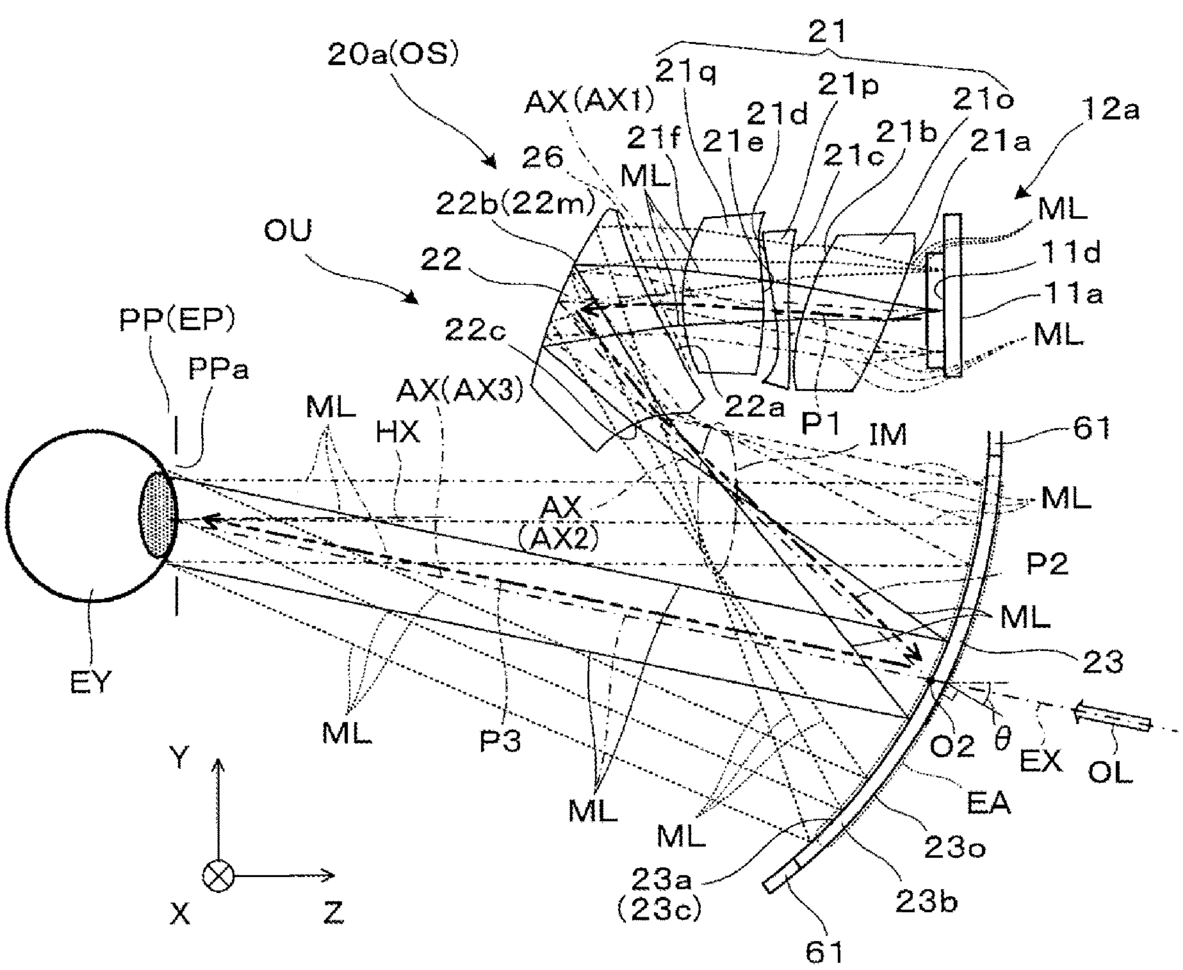
FIG. 3 is a side cross-sectional view for specifically explaining an optical structure of a display unit.

FIG. 3 is a side cross-sectional view for specifically explaining an optical structure of the first imaging optical system 20*a*. The first imaging optical system 20*a* includes two reflection surfaces, and an optical path is bent by the see-through mirror 23 and the prism mirror 22. The first imaging optical system 20*a* is a decentered optical system OS. The projection lens 21, the prism mirror 22, and the see-through mirror 23 are disposed to be non-axisymmetric. In the first imaging optical system 20*a*, the optical elements 21, 22, and 23 are arrayed along a reference plane by bending an optical axis AX in the reference plane parallel to a YZ plane corresponding to a decentering direction of the see-through mirror 23. Specifically, in the reference plane parallel to the YZ plane and corresponding to a plane of paper, an optical path portion P1 from the projection lens 21 to a reflection surface 22*b*, an optical path portion P2 from the reflection surface 22*b* to the see-through mirror 23, and an optical path portion P3 from the see-through mirror 23 to the eye point PP are disposed so as to be bent in a Z shape in two stages. Correspondingly, an optical axis portion AX1 from the projection lens 21 to the reflection surface 22*b*, an optical axis portion AX2 from the reflection surface 22*b* to the see-through mirror 23, and an optical axis portion AX3 from the see-through mirror 23 to the eye point PP are disposed so as to be bent in a Z shape in two stages. The see-through mirror 23 is inclined in a direction along the reference plane parallel to the YZ plane. The inclination direction of the see-through mirror 23 is the decentering direction of the see-through mirror 23 or the first imaging optical system 20*a*. In the see-through mirror 23, a normal line at a central position, that is, an optical origin O2, intersecting the optical axis AX forms an angle θ of about 40° to 50° with respect to a Z direction. In the first imaging optical system 20*a*, the optical elements 21, 22 and 23 constituting the first display device 100A are arrayed so that height positions thereof are changed in a vertical direction, and an increase in a lateral width of the first display device 100A can be prevented. Further, the optical path portions P1 to P3 or the optical axis portions AX1 to AX3 are disposed to be bent in a Z shape in the two stages by folding of the optical path due to reflection by the prism mirror 22 and the like, and the optical path portions P1 and P3 or the optical axis portions AX1 and AX3 are relatively close to horizontal. Thus, it is possible to reduce the size of the first imaging optical system 20*a* both in an up-down direction and a front-back direction. In addition, since an inclination angle θ of the central portion of the see-through mirror 23 is about 40° to 50°, when an inclination of the optical path portion P3 corresponding to the line of sight is constant, the inclination of the optical path portion P2 with respect to the Z-axis is about 70° to 90°, and a thickness of the virtual image display device 100 in the Z direction can be easily reduced.

In the first imaging optical system 20*a*, the optical path portion P1 from the projection lens 21 to the reflection surface 22*b* extends in a slightly obliquely upward direction or a direction nearly parallel to the Z direction toward a back side with respect to a viewpoint. The optical path portion P2 from the reflection surface 22*b* to the see-through mirror 23 extends obliquely downward toward a front side. With a horizontal plane direction (XZ plane) as a reference, an inclination of the optical path portion P2 is larger than an inclination of the optical path portion P1. The optical path portion P3 from the see-through mirror 23 to the eye point PP extends slightly obliquely upward or in a direction nearly parallel to the Z direction toward the back side. In the illustrated example, a portion of the optical axis AX corresponding to the optical path portion P3 corresponds to about −10°, with a downward direction toward the +Z direction as negative. That is, a see-through mirror 23 reflects the image light ML with the optical axis AX or the optical path portion P3 directed upward by a predetermined angle, that is, upward by about 10°. As a result, an emission optical axis EX that is an extension of the optical axis portion AX3 corresponding to the optical path portion P3 is inclined downward by about 10° with respect to a central axis HX parallel to the forward +Z direction and extends. This is because a line of sight of a human being is stable in a slightly lowered eye state in which the line of sight is inclined downward by approximately 10° with respect to a horizontal direction. The central axis HX that extends in the horizontal direction with respect to the eye point PP assumes a case in which the wearer US wearing the first display device 100A relaxes in an upright posture and faces the front and gazes at the horizontal direction or the horizontal line.

In the first imaging optical system 20*a*, the projection lens 21 includes a first lens 210, a second lens 21*p*, and a third lens 21*q*. The projection lens 21 receives the image light ML emitted from the first display element 11*a* and causes the image light ML to be incident on the prism mirror 22. The projection lens 21 focuses the image light ML emitted from the first display element 11*a* into a state close to a parallel luminous flux. An incident surface 21*a* and an emission surface 21*b* of the first lens 210, an incident surface 21*c* and an emission surface 21*d* of the second lens 21*p*, and an incident surface 21*e* and an emission surface 21*f* of the third lens 21*q* that constitute the projection lens 21 are free form surfaces or aspherical surfaces. Each of the optical surfaces 21*a*, 21*b*, 21*c*, 21*d*, 21*e* and 21*f* is asymmetric with respect to a vertical direction parallel to the YZ plane and intersecting the optical axis AX with the optical axis AX interposed therebetween, and is symmetric with respect to a lateral direction or an X direction with the optical axis AX interposed therebetween. The first lens 21, the second lens 21*p*, and the third lens 21*q* are made of, for example, a resin, but may also be made of glass. An antireflection film can be formed at each of the optical surfaces of the first lens 210, the second lens 21*p* and the third lens 21*q* constituting the projection lens 21.

The prism mirror 22 is an optical member having a refractive reflection function that is a mixture of a mirror function and a lens function, and refracts and reflects the image light ML from the projection lens 21. The prism mirror 22 includes an incident transmission surface 22*a* disposed on the light emission side of the first optical member, the reflection surface 22*b* for bending the optical axis AX, and an emission transmission surface 22*c* facing the reflection surface 22*b* and disposed in a direction symmetrical to the incident transmission surface 22*a*. The prism mirror 22 emits the image light ML incident from the front side, at which the projection lens 21 is disposed, with the image light ML bent in a direction inclined downward with respect to a direction reverse to an incident direction (a direction of a light source as seen from the prism mirror 22). The incident transmission surface 22*a*, the reflection surface 22*b*, and the emission transmission surface 22*c* that are the optical surfaces constituting the prism mirror 22 are asymmetrical with respect to the vertical direction (corresponding to the inclination direction of the see-through mirror 23 to be described below) parallel to the YZ plane and intersecting the optical axis AX with the optical axis AX interposed therebetween, and are symmetrical with respect to the lateral direction or the X direction with the optical axis AX interposed therebetween. The optical surfaces of the prism mirror 22, that is, the incident transmission surface 22*a*, the reflection surface 22*b* and the emission transmission surface 22*c* are, for example, free form surfaces. By forming these surfaces 22*a*, 22*b*, and 22*c* as free form surfaces, the flexibility of optical correction is increased, and it is possible to improve optical performances while avoiding an increase in size of the first projection optical system 12*a* and the like. The incident transmission surface 22*a*, the reflection surface 22*b* and the emission transmission surface 22*c* are not limited to the free form surfaces, and may be aspherical surfaces. The prism mirror 22 may be made of, for example, a resin, but may also be formed of glass. A light-blocking member 26 for preventing stray lights is disposed at or near the incident transmission surface 22*a*. The light-blocking member 26 will be described below in detail. The reflection surface 22*b* is an inner surface of a mirror film 22*m* constituted by a metal film or a dielectric multilayer film, but is not limited thereto, and may reflect the image light ML by total internal reflection, for example. When the reflection surface 22*b* is the inner surface of the mirror film 22*m*, a reflective film constituted by a single layer film or multilayer film made of metal such as Al or Ag is formed at the underlying optical surface corresponding to the reflection surface 22*b* by vapor deposition or the like, or a sheet-shaped reflective film made of metal is affixed thereto. Although detailed illustration is omitted, an antireflection film can be formed above the incident transmission surface 22*a* and the emission transmission surface 22*c*.

Figure 4:
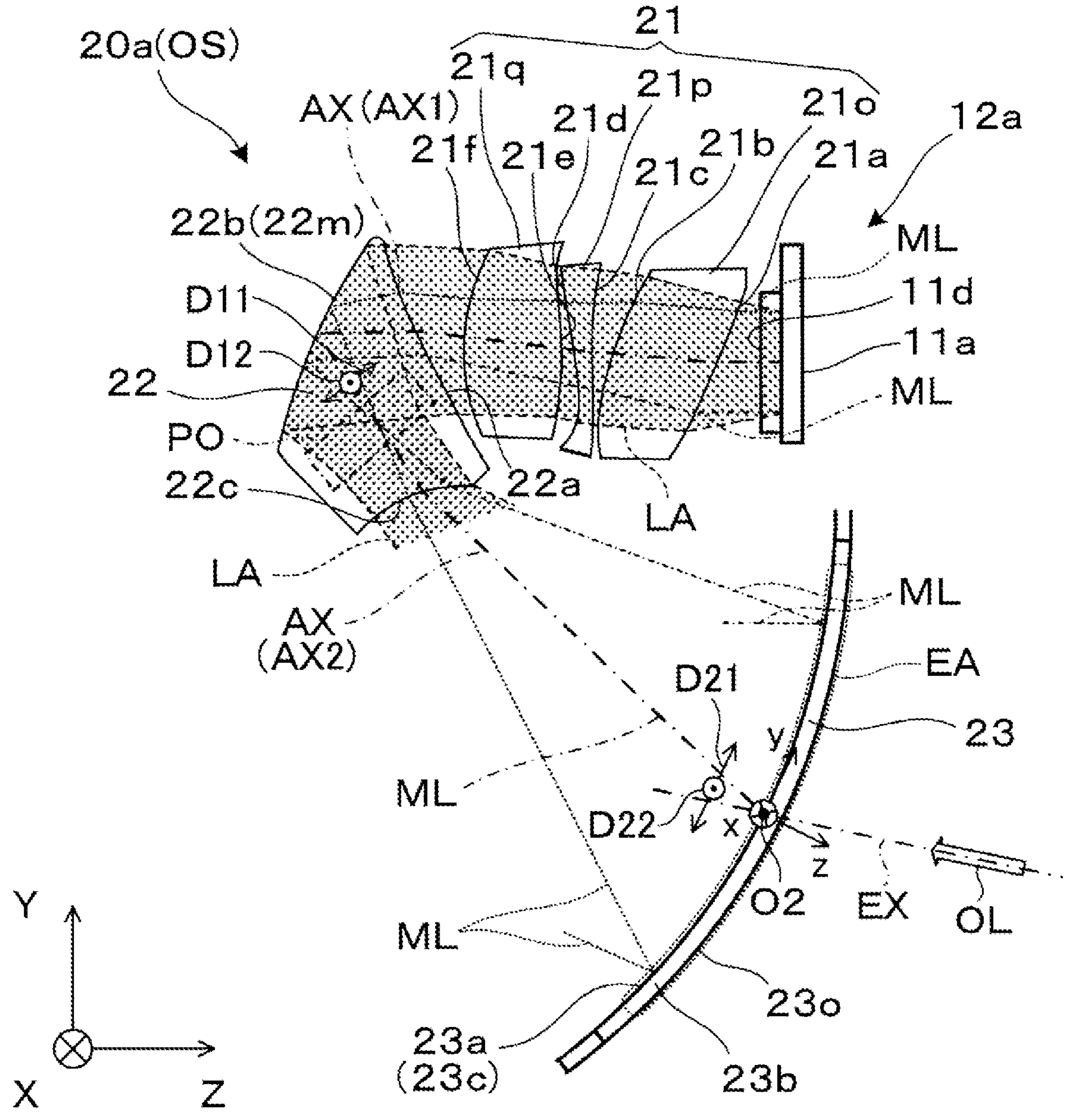

Referring to FIG. 4, an optical pupil position PO of the first imaging optical system 20*a* or the first projection optical system 12*a* is disposed in the prism mirror 22. Here, the optical pupil position PO is a place where the main light beams from the respective points on the display surface 11*d* of the first display element 11*a* intersect each other, the display surface 11*d* being an object surface. The optical pupil position PO corresponds to a place where the light beam flux cross section of the image light ML becomes small and narrow as a whole. In the case of the illustrated first imaging optical system 20*a*, the optical pupil position PO is substantially the same in the vertical direction and the lateral direction. To be more specific, in the first projection optical system 12*a*, the optical pupil position PO is substantially the same in a first direction D11 perpendicular to the optical axis portion AX2 (optical axis portion AX1 when in front of reflection surface 22*b*) and parallel to the reference plane parallel to the YZ plane and a second direction D12 perpendicular to the first direction D11 and the optical axis portion AX2 (optical axis portion AX1 when in front of reflection surface 22*b*) and consequently perpendicular to the reference plane, and is disposed at or near the reflection surface 22*b* (for the reference plane, refer to a reference plane HS illustrated in FIG. 6A and the like described below). The first direction D11 is a direction substantially parallel to the Y direction, and the second direction D12 is a direction parallel to the X direction. In a specific example, the optical pupil position in the vertical first direction D11 is disposed at a position slightly closer to the emission transmission surface 22*c* than the optical pupil position in the lateral second direction D12. The reflection surface 22*b* functions as an optical stop AS due to its rectangular contour, and can be referred to as an aperture stop because it is disposed at or near the optical pupil position PO. Since the reflection surface 22*b* reflects the image light ML within the effective area and does not reflect the image light ML outside the effective area, a surrounding region outside the effective area corresponding to an opening shape functions as a light-blocking body of the stop. In the surrounding region of the reflection surface 22*b*, a reflective film is not formed, an optical surface is not formed, or a discontinuous surface is formed. To be more specific, when the reflection surface 22*b* is provided with a reflective film, the shape of the reflective film can be made to correspond to the opening shape, but the present disclosure is not limited to this, and the reflective film can also be formed outside the optically effective area on the reflection surface 22*b*. In a specific example, the contour of the reflection surface 22*b* and the effective area substantially coincide with each other, and the reflective film is formed at the entire reflection surface 22*b*, but neither the reflective film nor the light-blocking film is formed at adjacent or nearby surfaces in the surrounding. When the reflection surface 22*b* is a total reflection surface that satisfies the total-reflection condition, the surrounding region may be processed to have transmissive property or light absorptivity.

In FIG. 4, a region LA through which the image light ML passes as a whole is indicated by dot-like hatching. It can be seen that the region LA through which the image light ML passes as a whole rapidly widens after the emission transmission surface 22*c* of the prism mirror 22.

When the size of the prism mirror 22 increases, the mass of the first projection optical system 12*a* tends to increase. However, when the optical pupil position PO is disposed in the prism mirror 22 as described above, it is possible to reduce the light beam flux cross section of the image light ML in the prism mirror 22. Accordingly, the light beam flux cross section of the image light ML passing through the incident transmission surface 22*a* or the emission transmission surface 22*c* also becomes relatively small, and it is possible to miniaturize the prism mirror 22 that is likely to increase in weight. In particular, when the optical pupil position PO is disposed at or near the reflection surface 22*b* in the prism mirror 22, it is possible to reduce both the size of the incident transmission surface 22*a* and the size of the emission transmission surface 22*c*, and it becomes easier to reduce the size of the prism mirror 22. Further, by making the reflection surface 22*b* function as the optical stop AS, it is not necessary to secure a space for disposing the stop member, and a support member for fixing the stop member is not necessary, so that it is possible to simplify the structure of the first projection optical system 12*a*.

The emission transmission surface 22*c* of the prism mirror 22 is a concave surface as a whole. The emission transmission surface 22*c* is a concave surface on the reference plane that is parallel to the YZ plane and through which the optical axis portions AX1 to AX3 pass, that is, on the paper surface. The emission transmission surface 22*c* is also a concave surface on a cross section CS (see FIG. 2) that is perpendicular to the YZ plane and that passes through the center of the emission transmission surface 22*c*. The emission transmission surface 22*c* of the prism mirror 22 is exposed at the emission opening 41*o* (see FIG. 2) of the barrel 41, thus by being formed as the concave surface, contact with an external object can be easily avoided and occurrence of damage can be suppressed. The emission transmission surface 22*c* of the prism mirror 22 is disposed not only at a place where the light beam cross section of the image light ML is narrowed, but also near a relatively small intermediate image IM (see FIG. 3), and can be made relatively small. Damage to the emission transmission surface 22*c* can also be suppressed by making the emission transmission surface 22*c* of the prism mirror 22 relatively small.

The refractive index of the prism mirror 22 may be as high as possible from the viewpoint of enhancing the reflectivity and from the viewpoint of utilizing the optical performances of the transmission surfaces 22*a* and 22*c*. However, when a general plastic material is used, as the refractive index increases, the Abbe number decreases, and the influence of chromatic aberration increases. Therefore, in a specific example, a material such as a COP material or a COC material is adopted with priority given to the Abbe number.

An optical element such as a prism or a lens is not disposed on the light emission side of the prism mirror 22, that is, between the prism mirror 22 and the see-through mirror 23. Thereby, it is possible to simplify the structure of the first projection optical system 12*a*.

Returning to FIG. 3, the see-through mirror 23 or the first combiner 103*a* is a curved plate-shaped reflective optical member that functions as a concave surface mirror, and reflects the image light ML from the prism mirror 22 and partially transmits outside light OL. The see-through mirror 23 reflects the image light ML from the prism mirror 22 toward the eye point PP. The see-through mirror 23 includes a transmissive mirror surface 23*c* and an outer surface 230. The see-through mirror 23 is disposed inclined with respect to the optical path (corresponding to the optical path portion P2) of the image light ML emitted from the first projection optical system 12*a*, and transmits the image light ML. Therefore, the transmissive mirror surface 23*c* is also disposed inclined with respect to the optical path (corresponding to the optical path portion P2) of the image light ML emitted from the first projection optical system 12*a*, and transmits the image light ML.

The see-through mirror 23 partially reflects the image light ML. The see-through mirror 23 is a concave mirror that covers the eye point PP at which the eye EY or the pupil is disposed, has a concave shape toward the eye point PP, and has a convex shape toward the outside. The eye point PP or its opening PPa is called the eyebox. The eye point PP or the opening PPa corresponds to an emission pupil EP on the emission side of the first imaging optical system 20*a*. The see-through mirror 23 functions as a collimator, and converges a main light beam of the image light ML emitted from each point on the display surface 11*d*, forming an image at or near the emission side of the prism mirror 22 of the first projection optical system 12*a*, and then spreading, at the eye point PP. The see-through mirror 23, as the concave mirror, enables enlarged viewing of the intermediate image IM formed by the first display element 11*a* as the image light generation device and re-imaged by the first projection optical system 12*a*. More specifically, the see-through mirror 23 causes the image light ML from each point of the intermediate image IM formed behind the emission transmission surface 22*c* of the prism mirror 22 to be incident on the eye point PP in a collimated state so as to be collected as a whole. The see-through mirror 23 needs to have a spread equal to or greater than that of an effective area EA corresponding to an angle of view from the viewpoint of being disposed between the intermediate image IM and the eye point PP. Here, the angle of view is obtained by combining vertical or horizontal viewing angles with the optical axis AX extending in the front direction of the eye as a reference, and is set to about 40° to 50° in a diagonal direction in a specific example. In the see-through mirror 23, an outer area extending to the outside of the effective area EA does not directly affect image formation, and thus can have any surface shape. However, from the viewpoint of ensuring an appearance like a spectacle lens, the surface shape may have the same curvature as that of a surface shape an outer edge of the effective area EA, or continuously change from the outer edge.

The see-through mirror 23 is a semi-transmissive type mirror plate having a structure in which a transmissive reflective film 23*a* is formed above a back surface of a plate-shaped body 23*b*. The transmissive mirror surface 23*c* of the see-through mirror 23 is asymmetric with respect to the vertical direction parallel to the YZ plane and intersecting the optical axis AX, that is, with respect to the inclination direction of the see-through mirror 23 or the transmissive mirror surface 23*c*, and is symmetric with respect to the lateral direction or the X direction with the optical axis AX interposed therebetween. The transmissive mirror surface 23*c* of the see-through mirror 23 is, for example, a free form surface. The transmissive mirror surface 23*c* needs to have a spread equal to or greater than that of the effective area EA. When the transmissive mirror surface 23*c* is formed in the outer area wider than the effective area EA, a difference in visibility is less likely to occur with respect to an external image from behind the effective area EA and an external image from behind the outer area.

Referring to FIG. 4, the transmissive mirror surface 23*c* has a curved surface shape with identical sag amounts at the effective area ends of the effective area EA in two directions orthogonal to each other. Here, the two directions orthogonal to each other with respect to the transmissive mirror surface 23*c* mean a vertical direction and a lateral direction of the transmissive mirror surface 23*c*. In the example illustrated in FIG. 3, the vertical direction corresponds to a first direction (y direction in the figure) that extends through the optical origin O2 at which the optical axis portion AX2 intersects the transmissive mirror surface 23*c* and is parallel to a vertical tangent line parallel to the reference plane parallel to the YZ plane, and the lateral direction corresponds to a second direction (x direction in the figure) that is perpendicular to the first direction, i.e., the vertical tangent and the optical axis portion AX2 and consequently perpendicular to the YZ plane or the reference plane. The first direction is a direction between the Y direction and the Z direction and corresponds to the decentering direction of the transmissive mirror surface 23*c*, and the second direction is a direction parallel to the X direction. That is, with respect to the transmissive mirror surface 23*c*, the effective area ends of the effective area EA mean the upper and lower ends and the left and right ends in principle. In addition, the sag amount is a length amount indicating, as a reference in units of optical surfaces, how much an optical surface protrudes or is recessed, with an origin or a vertex through which the optical axis AX extends in the optical surface as a reference, with respect to the origin or the vertex. When the transmissive mirror surface 23*c* is a free form surface, the shape of the transmissive mirror surface 23*c* can be expressed by a polynomial of two variables obtained by combining distances in two directions perpendicular to the optical axis, and when the transmissive mirror surface 23*c* is an aspherical surface, the shape of the transmissive mirror surface 23*c* can be expressed by a polynomial of a radius perpendicular to the optical axis. Specifically, in the case of a free form surface, for example, when considering a freely selected point (x, y) in the first direction (y direction in the figure) and the second direction (x direction in the figure) on the coordinate plane with a coordinate plane extending through the origin and perpendicular to the optical axis extending through the origin as a reference, a distance from the point (x, y) to the optical surface of interest in the normal direction (z direction) of the coordinate plane is the sag amount, and the sag amount is given as a function s (x, y) of x and y. The function s is specified by the coefficients of a polynomial including, for example, x, y, $x^2$, xy, $y^2$, $x^2y$, and $xy^2$. The case where the sag amounts are identical is not limited to a case where the sag amounts are strictly identical, and includes a case where there is a difference of about several tens of percent in the sag amounts. Since the transmissive mirror surface 23*c* has a curved surface shape with identical sag amounts at the upper and lower ends and the left and right ends that are the effective area ends in the first direction and the second direction, it is possible to make the light condensing power of the transmissive mirror surface 23*c* or the see-through mirror 23 in the first direction and the second direction substantially identical. When there is a difference in the size of the effective area in the vertical and lateral directions, the light condensing power of the transmissive mirror surface 23*c* or the see-through mirror 23 in the first direction and the second direction can be made substantially identical by setting a square region based on the size in the short direction as a determination target, that is, regarding the outer edge of the square region as an effective area end to be compared, and setting the optical surface shape to have a curved surface shape with identical sag amounts at the upper and lower ends and the left and right ends. As a result, the optical pupil position PO of the first imaging optical system 20*a* or the first projection optical system 12*a* can be made substantially the same in the vertical direction and the lateral direction. Accordingly, it is possible to suppress an increase in the size of the prism mirror 22 that is an optical element at or near the position of the optical pupil of the first projection optical system 12*a*, and it is possible to reduce the size and weight of the first imaging optical system 20*a*. In addition, since the transmissive mirror surface 23*c* has a curved surface shape with identical sag amounts at the effective area ends in the first direction and the second direction, it is possible to suppress the astigmatic aberration of the transmissive mirror surface 23*c* to be low, and it is not necessary to create astigmatic aberration corresponding to the radius of curvature of the transmissive mirror surface 23*c* on the first projection optical system 12*a* side. Therefore, it is possible to increase the flexibility of optical design and improve the optical properties of the first imaging optical system 20*a*.

Regarding the transmissive mirror surface 23*c*, when there is a difference in the size of the effective area in the vertical and lateral directions at the effective area ends in the first direction and the second direction, the difference in sag amounts may be small at the effective area ends based on the square region that is based on the size in the short direction. In the transmissive mirror surface 23*c* of a specific example, the difference between the sag amounts at the effective area ends in the first direction and the second direction is equal to or less than 1 mm. By suppressing the difference in the sag amounts to be equal to or smaller than 1 mm in this manner, it is possible to reduce the cross-sectional size corresponding to the size of the light beam flux cross section of the image light ML in the prism mirror 22 and the cross-sectional size of the image light at the optical pupil position PO. The transmissive mirror surface 23*c* may be one in which the difference between the sag amounts at the effective area ends in the first direction and the second direction exceeds 1 mm, but may be one in which the difference is less than or equal to 2 mm, and may be one in which the difference is less than or equal to 1.5 mm.

The transmissive mirror surface 23*c* has a curved surface shape with identical sag amounts at the effective area ends based on the square region that is based on the size in the short direction, when there is a difference in the size of the effective area in the vertical and lateral directions at the effective area ends in the first direction and the second direction (that is, the upper and lower ends and the left and right ends). More strictly, the transmissive mirror surface 23*c* may have identical curvature shapes in two directions orthogonal to each other. Here, the transmissive mirror surface 23*c* having identical curvature shapes with respect to the two directions orthogonal to each other means that the transmissive mirror surface 23*c* has identical curvature shapes with respect to the two directions orthogonal to each other at each point on the transmissive mirror surface 23*c*. However, this is not limited to the case where the curvature shapes are strictly identical at each point on the transmissive mirror surface 23*c*, and a certain degree of difference in the curvature radius is allowed. Specifically, the difference between the radii of curvature in the two directions may be 0% to 35% or less, and may be 20% or less. As described above, when the transmissive mirror surface 23*c* has a curved surface shape with identical sag amounts at the upper and lower ends and the left and right ends, or when there is a difference in the size of the effective area in the vertical and lateral directions, it can be said that the transmissive mirror surface 23*c* having a curved surface shape with identical sag amounts at the upper and lower ends and the left and right ends of the square region that is based on the short direction size has a curved surface corresponding to a spherical surface or an aspherical surface.

Figure 5:
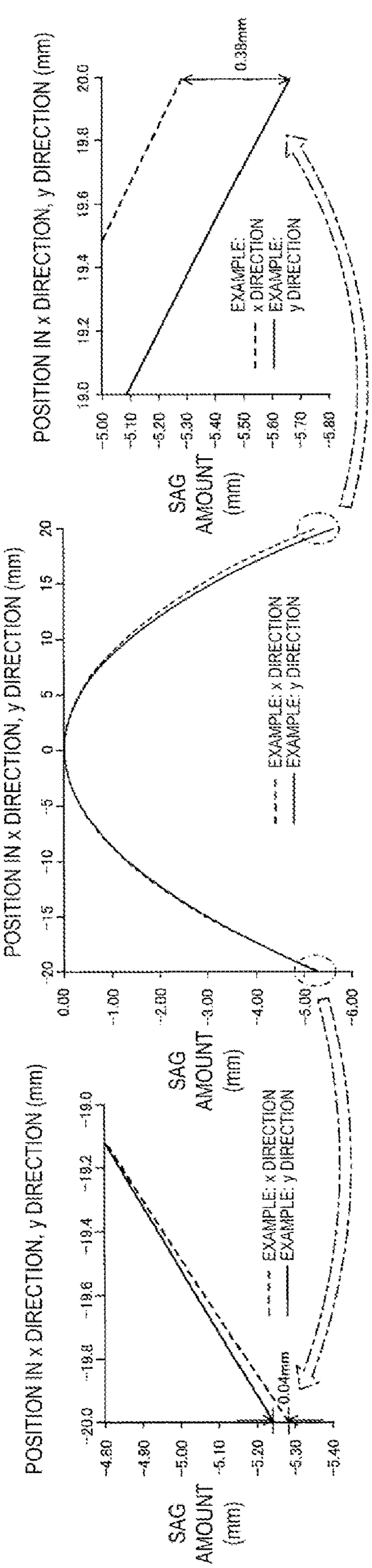
FIG. 5 shows sag amounts of the transmissive mirror surface with respect to two reference intersecting directions.

FIG. 5 is a chart showing the sag amounts in the first direction and the second direction of the transmissive mirror surface 23*c* in a specific example. The sag amounts in the first direction and the second direction, that is, the sag amount in the x direction and the sag amount in the y direction with the optical origin O2 as a reference coincide with each other as a whole. When comparing the difference in the sag amounts between the two orthogonal directions, if the direction in which the effective area is wide is used as a reference, the sag amount in the y direction is shifted to the + side on the −x side and shifted to the − side on the +x side with respect to the sag amount in the x direction at the position of the effective area end (20 mm in the x direction and an expanded 20 mm in the y direction). The difference between the sag amount in the y direction and the sag amount in the x direction is 0.04 mm at the effective area end on the −x side, and the difference between the sag amount in the y direction and the sag amount in the x direction is 0.38 mm at the effective area end on the +x side. When comparing the difference in the sag amounts between two orthogonal directions, the direction in which the effective area is narrow (short direction) is used as a reference in principle. That is, a square region based on the size in the short direction is set as a determination target. In this case, with respect to the position of the effective area end (14 mm in the xy direction), the difference between the sag amount in the y direction and the sag amount in the x direction is 0.06 mm at the effective area end on the −y side, and the difference between the sag amount in the y direction and the sag amount in the x direction is 0.19 mm at the effective area end on the +y side. Since the total sag amount is about 5 mm, the difference between the sag amount in the x direction and the sag amount in the y direction is approximately −3 mm at the effective area end, which is less than 7% of the total sag amount. It can be said that the transmissive mirror surface 23*c* has a curved surface shape with identical sag amounts at the effective area ends in the first direction and the second direction. Further, it can be said that the transmissive mirror surface 23*c* in a specific example has substantially the same curvatures as a whole in the x direction and the y direction, and has identical curvature shapes in the first direction and the second direction.

Figure 6A:
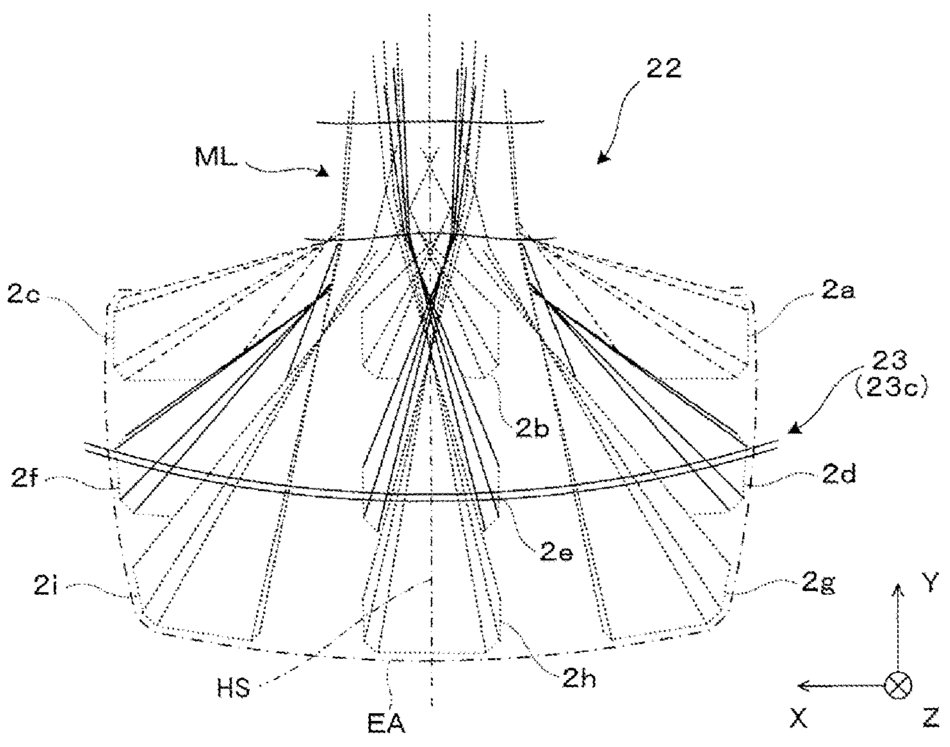
FIG. 6A is a view for explaining an incident state of image light on the transmissive mirror surface.

FIG. 6A is a view for explaining an incident state of the image light ML on the transmissive mirror surface 23*c* in a specific example. The image light ML from the display surface 11*d* of the first display element 11*a* is incident on the entire transmissive mirror surface 23*c* in a spreading manner. A light beam 2*a* from the left lower end region of the display surface 11*d* is incident on the upper right region of the transmissive mirror surface 23*c*, a light beam 2*b* from the central lower end region of the display surface 11*d* is incident on the upper center region of the transmissive mirror surface 23*c*, and a light beam 2*c* from the right lower end region of the display surface 11*d* is incident on the upper left region of the transmissive mirror surface 23*c*. A light beam 2*d* from the vertically intermediate region at the left end of the display surface 11*d* is incident on the vertically intermediate region at the right end of the transmissive mirror surface 23*c*, a light beam 2*e* from the central region of the display surface 11*d* is incident on the central region of the transmissive mirror surface 23*c*, and a light beam 2*f* from the vertically intermediate region at the right end of the display surface 11*d* is incident on the vertically intermediate region at the left end of the transmissive mirror surface 23*c*. A light beam 2*g* from the upper left end region of the display surface 11*d* is incident on the lower right region of the transmissive mirror surface 23*c*, a light beam 2*h* from the central upper end region of the display surface 11*d* is incident on the lower center region of the transmissive mirror surface 23*c*, and a light beam 2*i* from the upper right end region of the display surface 11*d* is incident on the lower left region of the transmissive mirror surface 23*c*.

Figure 6B:
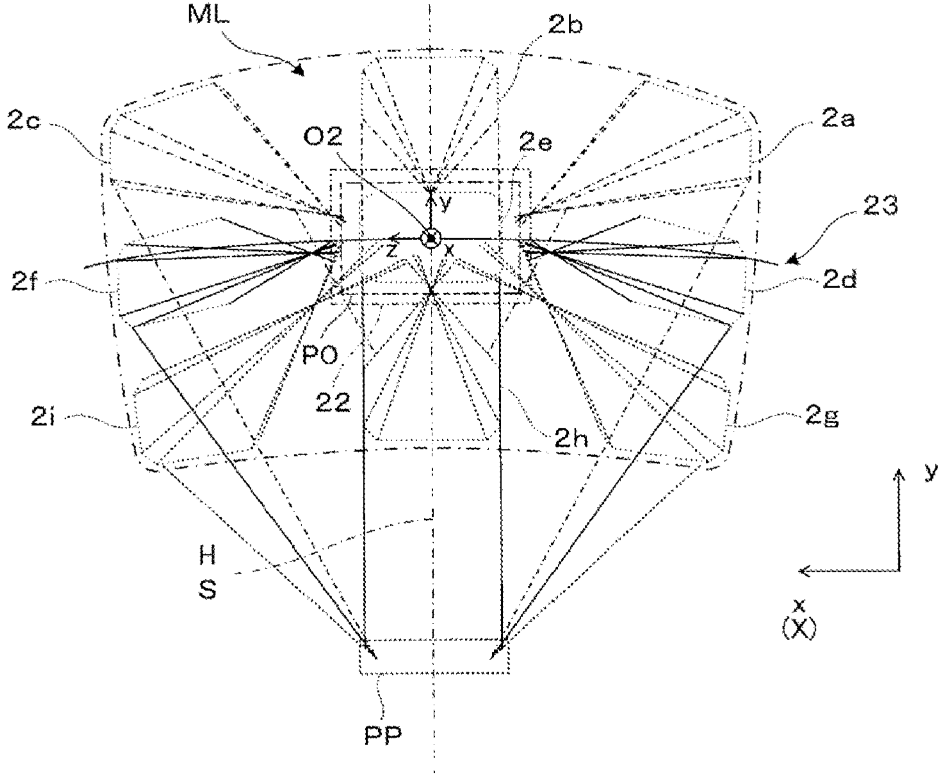
FIG. 6B is a view illustrating an incident state of the image light on the transmissive mirror surface as viewed from a prism mirror.

FIG. 6B is a view illustrating an incident state of the image light ML on the transmissive mirror surface 23*c* in a specific example, as viewed from the prism mirror 22 side along the optical axis portion AX2.

Figure 7A:
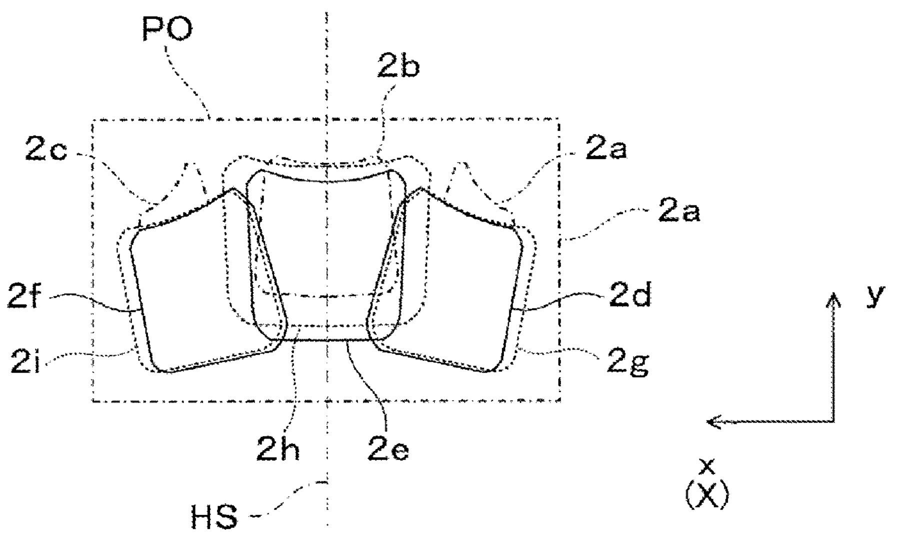
FIG. 7A is a view for explaining a passing state of the image light at a vertical optical pupil position.
Figure 7B:
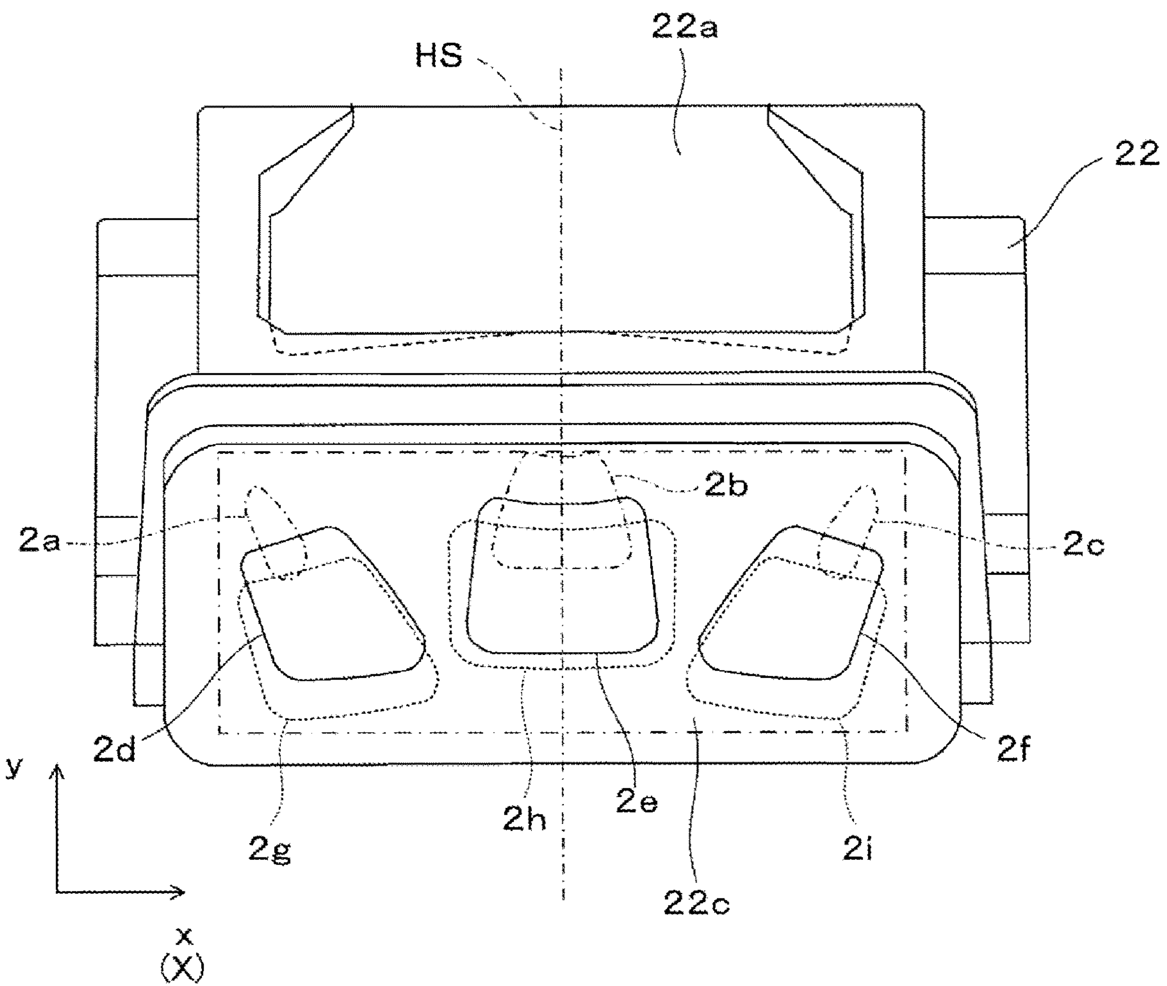
FIG. 7B illustrates a passing state of the image light at an emission transmission surface of the prism mirror.

FIG. 7A is a view for explaining a passing state of the image light ML at the vertical optical pupil position PO illustrated in the center of FIG. 6B. In addition, FIG. 7B is a view for explaining a passing state of the image light ML on the emission transmission surface 22*c* of the prism mirror 22. In FIG. 7A and the like, light beams 2*a* to 2*i* correspond to the light beams 2*a* to 2*i* illustrated in FIG. 6A. It can be seen that, at the vertical optical pupil position PO and the emission transmission surface 22*c*, the light beams 2*a* to Zi are superimposed in the vertical direction and the passing area is narrowed.

Figure 8:
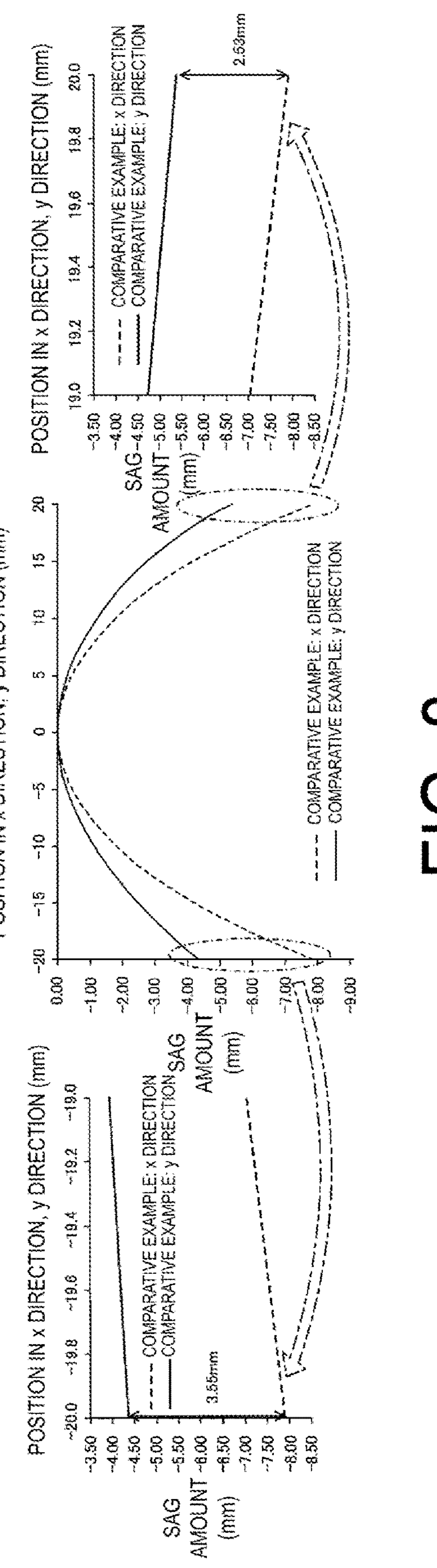
FIG. 8 shows sag amounts of the transmissive mirror surface with respect to two reference intersecting directions in a comparative example.

FIG. 8 is a chart showing sag amounts in a first direction and a second direction of a transmissive mirror surface in a virtual image display device of a comparative example (specifically, a virtual image display device disclosed in JP-A-2020-19803). At the position (approximately 20 mm) of the effective area end with respect to the x direction, the sag amount in the y direction is shifted to the + side on the −y side and the +y side with respect to the sag amount in the x direction. The difference between the sag amount in the y direction and the sag amount in the x direction is 3.55 mm at the effective area end on the −y side, and the difference between the sag amount in the y direction and the sag amount in the x direction is 2.53 mm at the effective area end on the +y side. When a square region based on the short direction size is a determination target, with respect to the position of the effective area end (14 mm in the xy direction), the difference between the sag amount in the y direction and the sag amount in the x direction is approximately 1.4 mm at the effective area end on the −y side, and the difference between the sag amount in the y direction and the sag amount in the x direction is approximately 1.2 mm at the effective area end on the ty side. Since the total sag amount is about 3 mm, the difference between the sag amount in the x direction and the sag amount in the y direction is about 50%, and thus it cannot be said that the sag amounts are identical at the effective area ends in the first direction and the second direction.

Figure 9A:
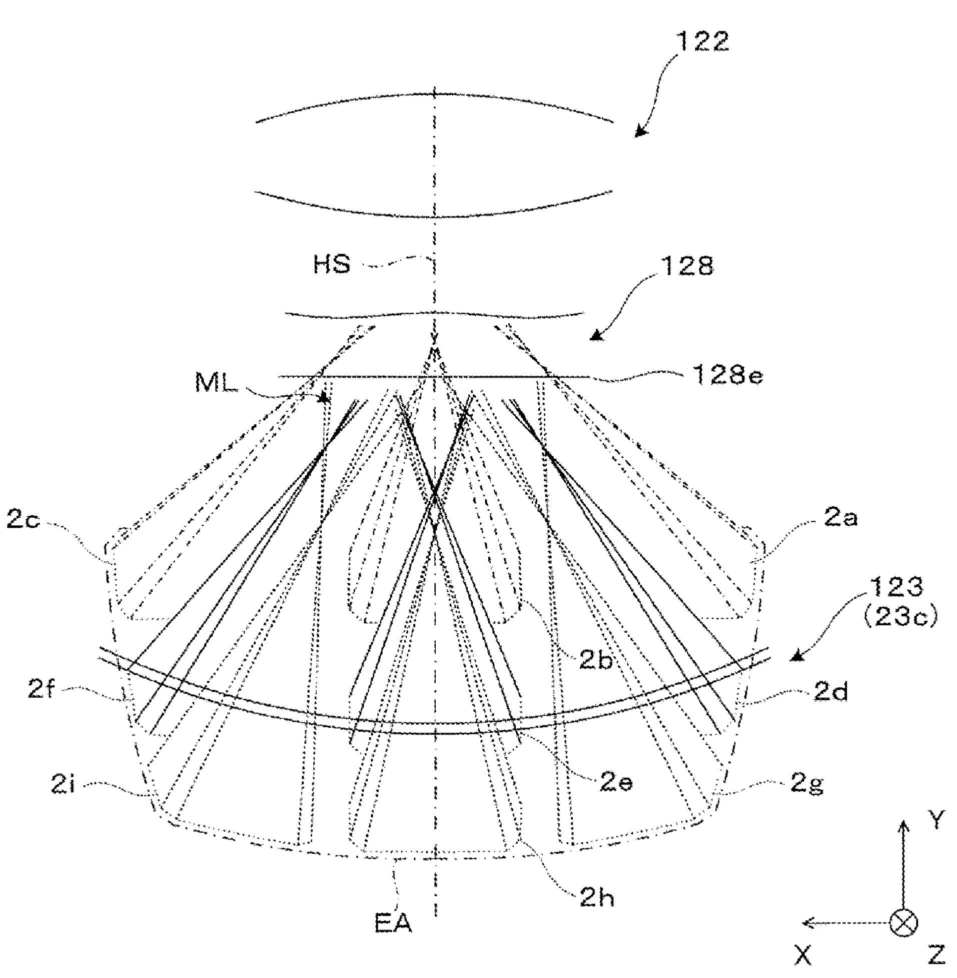
FIG. 9A is a view for explaining an incident state of image light on the transmissive mirror surface in the comparative example.

FIG. 9A is a view for explaining an incident state of the image light ML on the transmissive mirror surface 23*c* of the see-through mirror 123 in the virtual image display device according to the comparative example. In this case, a wedge-shaped prism 128 is disposed between a prism mirror 122 and a see-through mirror 123. The image light ML from the display surface 11*d* of the first display element 11*a* is incident on the entire transmissive mirror surface 23*c* in a spreading manner. The light beams 2*a* to 2*i* are emitted from the respective points of the upper, lower, left, right, and center of the display surface 11*d*, and correspond to the light beams 2*a* to 2*i* illustrated in FIG. 6A.

Figure 9B:
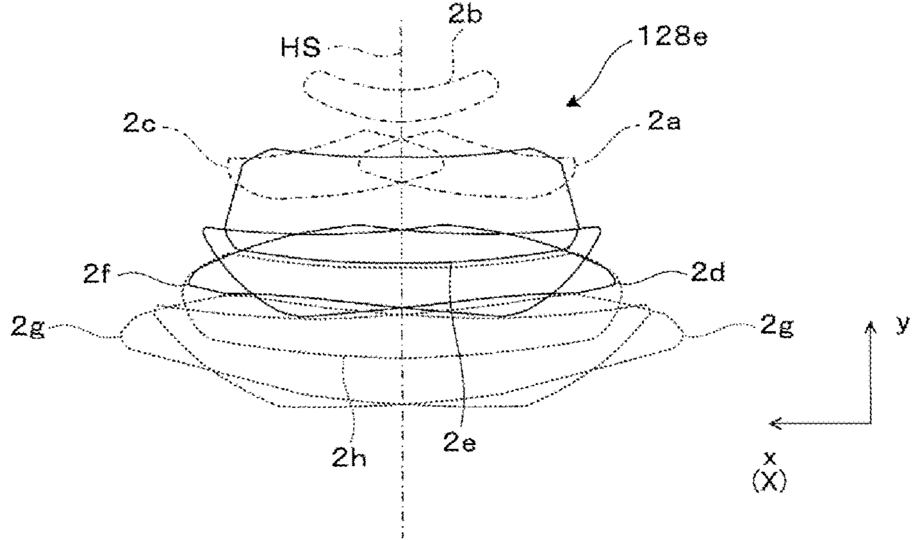
FIG. 9B is a view illustrating a passing state of the image light at an emission transmission surface of the comparative example.

FIG. 9B is a view for explaining a passing state of the image light ML on the emission transmission surface 22*c* of the prism mirror 122. In FIG. 9B, light beams 2*a* to 2*i* correspond to the light beams 2*a* to 2*i* illustrated in FIG. 9A. It can be seen that, in the emission transmission surface 22*c* of the prism mirror 122, the light beams 2*a* to 2*i* are separated in the vertical direction and the passing area is widened.

Figure 10A:
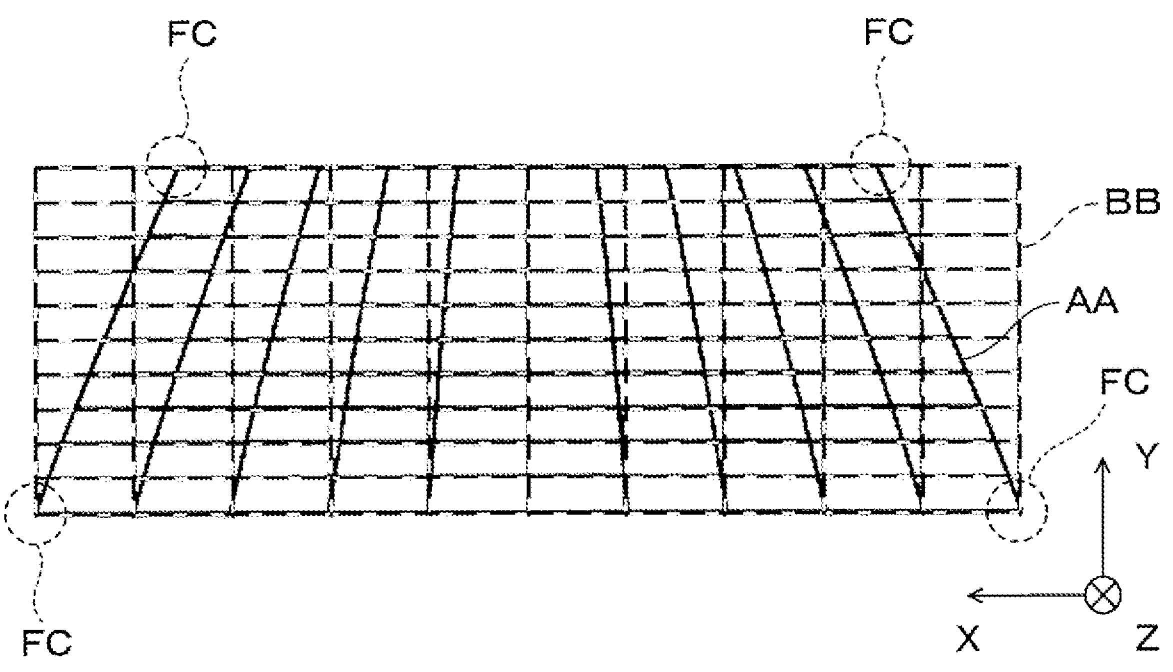
FIG. 10A is a view for explaining distortion in a specific example.

FIG. 10A is a view for explaining distortion in the first imaging optical system 20*a* of a specific example. A virtual image AA formed at the eye EY side when correction is not performed is compared with an original image BB displayed on the display element 11. In the virtual image AA, the distortion remains because emphasis is placed on suppression of astigmatic aberration, but there is almost no distortion in the vertical direction in the entire virtual image AA including four corners FC where distortion is particularly significant. Here, the vertical direction is a direction along the reference plane HS parallel to the Y direction and the Z direction, and corresponds to the y direction in the see-through mirror 123. That is, in the first imaging optical system 20*a* of a specific example, adjustment for controlling to an optical-distortion shape with almost no distortion in the vertical direction is achieved. In this case as well, the display control device 88 that operates the first display element 11*a* needs to correct the optical distortion of the display image. However, since there is no distortion in the vertical direction in the correction, it is possible to reduce calculation processing in image processing and to reduce a circuit load. As a result, not only the distortion correction can be performed by the correction ICs for low-flux processing, but also the power consumption of the HMD 200 product as a whole can be reduced.

Figure 10B:
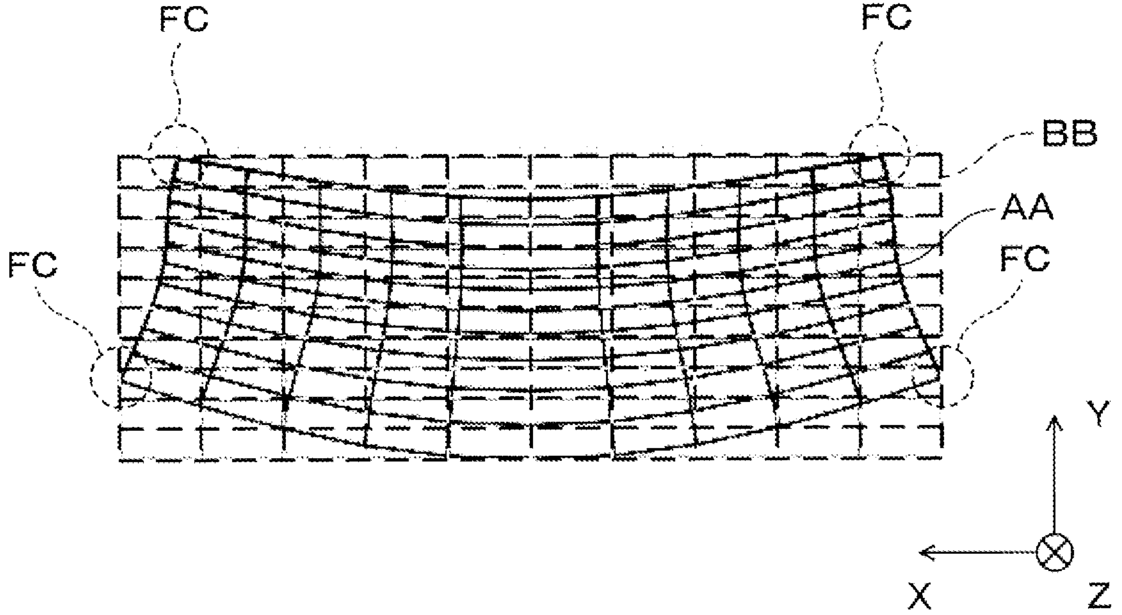
FIG. 10B is a view for explaining distortion in the comparative example.

FIG. 10B is a view for explaining distortion in the virtual image display device according to the comparative example. The virtual image AA is distorted in both the lateral direction and the vertical direction. In the case of the virtual image display device of the comparative example, since it is necessary to intentionally adjust the curvature of the transmissive mirror surface so as to cancel the astigmatic aberration inside the optical system and it is necessary to create the astigmatic aberration corresponding to the curvature of the transmissive mirror surface by the projection lens, the degree of freedom of the optical design is low and the control of the optical distortion is not easy, thus it is not easy to control the optical distortion only in the lateral direction, and the optical distortion remains in the vertical direction.

Figure 11:
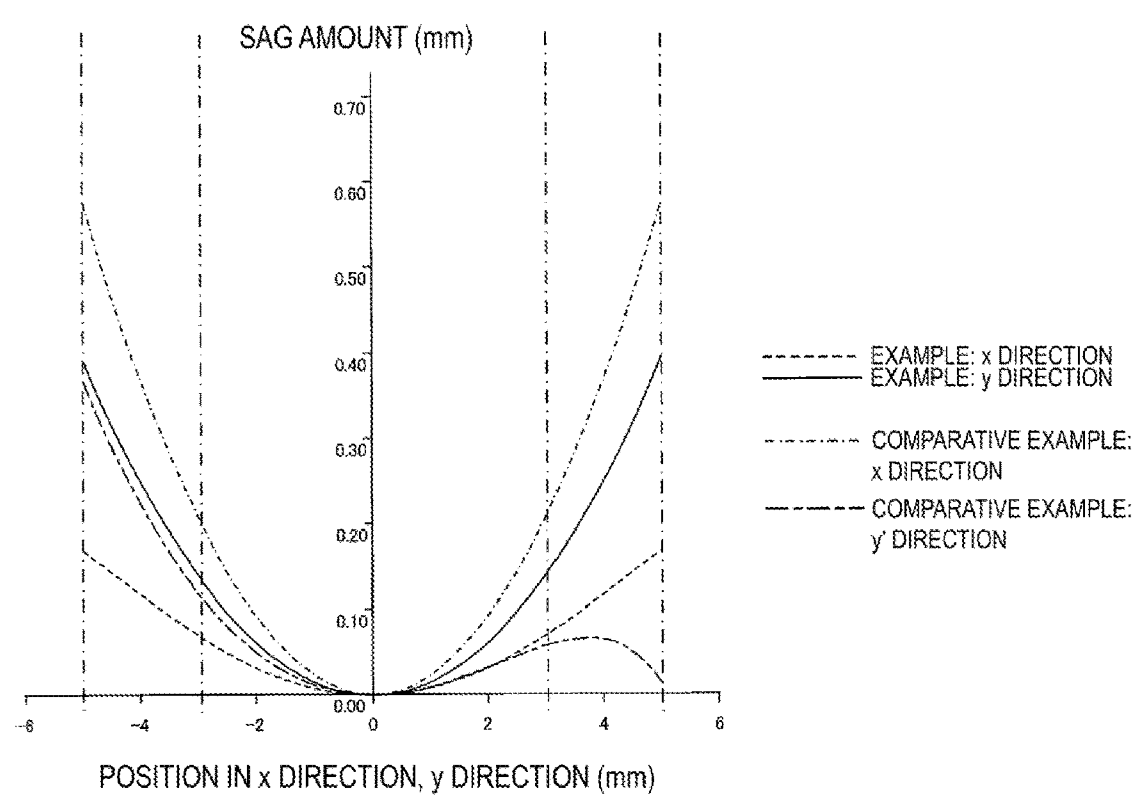
FIG. 11 illustrates sag amounts in two intersecting directions with respect to a reflection surface of the prism mirror.

FIG. 11 is a chart illustrating the sag amounts in two intersecting directions with respect to the reflection surface 22*b* of the prism mirror 22 in a specific example and the comparative example. Here, in the comparative example, the first direction, i.e., the y' direction is different in inclination from the first direction D11 of the example, but the second direction, i.e., the x direction coincides with the second direction D12 of the example.

As is clear from the chart, in a specific example, the pair of sag amounts at the effective area ends ±3 mm in the first direction (corresponding to the y direction) of the reflection surface 22*b* are equal to each other at approximately 0.14, and the pair of sag amounts at the effective area ends ±5 mm in the second direction (corresponding to the x direction) are equal to each other at approximately 0.17. When the difference in the sag amount is compared between two orthogonal directions, the direction in which the effective area is narrow is used as a reference. That is, with respect to the reflection surface 22*b*, the difference between the sag amounts at the effective area ends in the two orthogonal directions is 0.07 on the + side and 0.07 on the − side with the square region of ±3 mm as a reference. When the direction in which the effective area is wide is used as a reference, the difference in the sag amount is 0.2 on the + side and 0.25 on the − side with ±5 mm as a reference. On the other hand, in the comparative example, the sag amount at the effective area end in the first direction of the reflection surface 22*b* and the sag amount at the effective area end in the second direction differ greatly. Further, in the case of the reflection surface 22*b* of the comparative example, the difference between the sag amounts at the effective area ends in the two orthogonal directions is 0.15 on the + side and 0.09 on the − side with ±3 mm as a reference. When the direction in which the effective area is wide is used as a reference, the difference in the sag amount is 0.55 on the + side and 0.25 on the − side with ±5 mm as a reference. It can be said that the difference in the sag amount depending on the direction is large in both the specific example and the comparative example, and it can be said that the difference in the sag amounts in two intersecting directions is particularly large in the comparative example. Further, in the specific example, it can be seen that the difference between the sag amounts in the two intersecting directions of the reflection surface 22*b* is relatively larger on at least one side than the difference between the sag amounts in the two intersecting directions of the transmissive mirror surface 23*c* even though the size of the reflection surface 22*b* is small. Considering the ratio (4:1) in consideration of the dimensional difference, the difference between the sag amounts in the two intersecting directions of the transmissive mirror surface 23*c* is surely larger than the difference between the sag amounts in the two intersecting directions of the reflection surface 22*b*.

In the above description, the transmissive mirror surface 23*c* is a free form surface, but the transmissive mirror surface 23*c* may be a spherical surface or an aspherical surface. In this case, the sag amounts at the effective area ends of the transmissive mirror surface 23*c* in the first direction and the second direction are completely identical, and no difference in sag amount occurs. When the transmissive mirror surface 23*c* is a spherical surface or an aspherical surface, a general rotary cutting tool can be used. Therefore, the ease of processing of a mold including a transfer surface corresponding to the transmissive mirror surface 23*c* is increased, and the surface accuracy of the transmissive mirror surface 23*c* is improved.

Returning to FIG. 3 and the like, in describing the optical path, the image light ML from the first display element 11*a* is incident on the projection lens 21 and is emitted from the projection lens 21 in a substantially collimated state. The image light ML that has passed through the projection lens 21 is incident on the prism mirror 22, passes through the incident transmission surface 22*a* while being refracted, is reflected by the reflection surface 22*b* with a high reflectance close to 100%, and is refracted again by the emission transmission surface 22*c*. The image light ML from the prism mirror 22, after once forming the intermediate image IM, is incident on the see-through mirror 23 and is reflected by the transmissive mirror surface 23*c* with a reflectance of about 50% or less. The image light ML reflected by the see-through mirror 23 is incident on the eye point PP at which the eye EY or pupil of the wearer US is placed. The outside light OL passing through the see-through mirror 23 and the support plate 61 around the see-through mirror 23 is also incident on the eye point PP. In other words, the wearer US wearing the HMD 200 including the first display device 100A can observe a virtual image of the image light ML in a state where it is superimposed on an external image.

Figure 12:
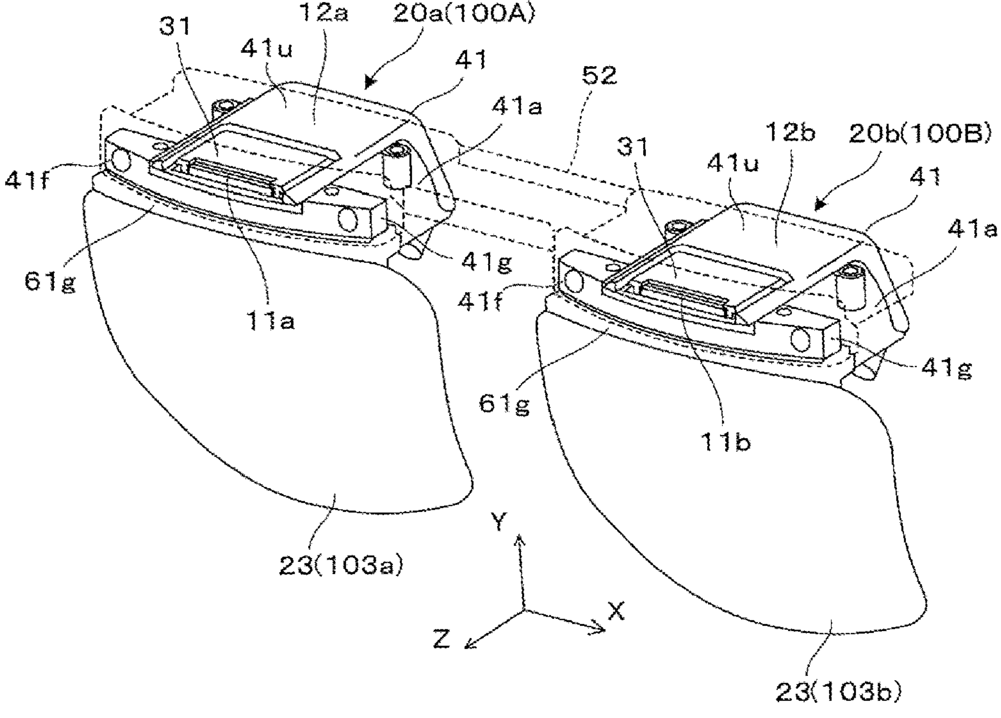
FIG. 12 is a perspective view for explaining an internal support structure of a head-mounted display.

Referring to FIG. 12, in the first display device 100A, the first imaging optical system 20*a* is fixed to a portion on the −X side of an elongated frame 52 indicated by a dotted line by using a fastener such as a screw, and is supported so as to be suspended from the frame 52. In the second display device 100B, the second imaging optical system 20*b* is fixed to a portion on the +X side of the elongated frame 52 by using a fastener such as a screw, and is supported so as to be suspended from the frame 52. The frame 52 is made of a metal material from the viewpoint of ensuring rigidity.

The first imaging optical system 20*a* includes the first projection optical system 12*a* and the first combiner 103*a* in an integrated state, and the second imaging optical system 20*b* includes a second projection optical system 12*b* and the second combiner 103*b* in an integrated state. In the first projection optical system 12*a*, an upper end 61*g* of the first combiner 103*a* is fixed to the barrel 41 by adhesion or the like in a positioned state. The barrel 41 of the first projection optical system 12*a* includes a space for accommodating the first display element 11*a*, and supports the first display element 11*a* in an aligned state with respect to the projection lens 21 and the like illustrated in FIG. 2 and the like. In the second projection optical system 12*b*, the upper end 61*g* of the second combiner 103*b* is fixed to the barrel 41 by adhesion or the like in a positioned state. The barrel 41 of the second projection optical system 12*b* includes a space for accommodating the second display element 11*b*, and supports the second display element 11*b* in an aligned state with respect to the projection lens 21 and the like illustrated in FIG. 2 and the like.

Figure 13:
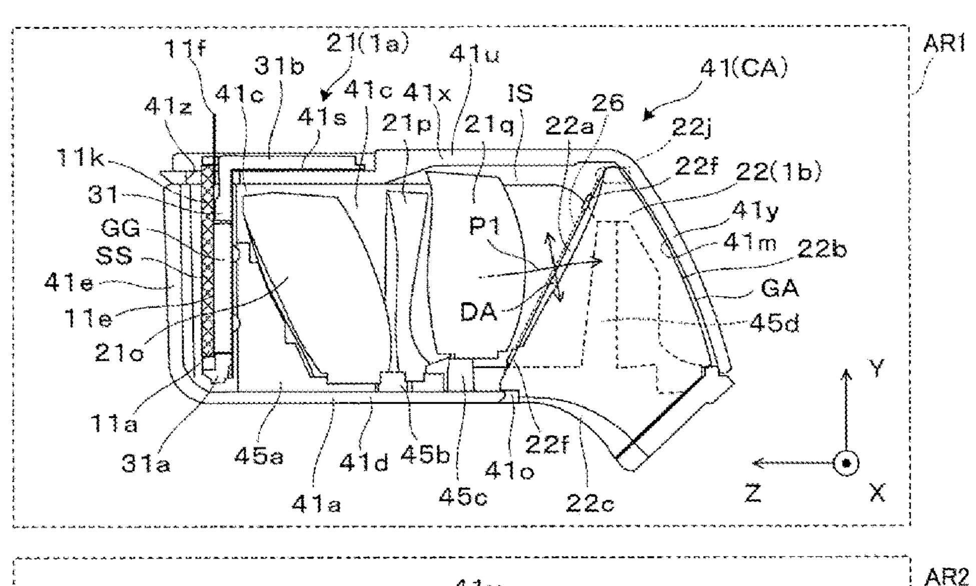
Figure 13:
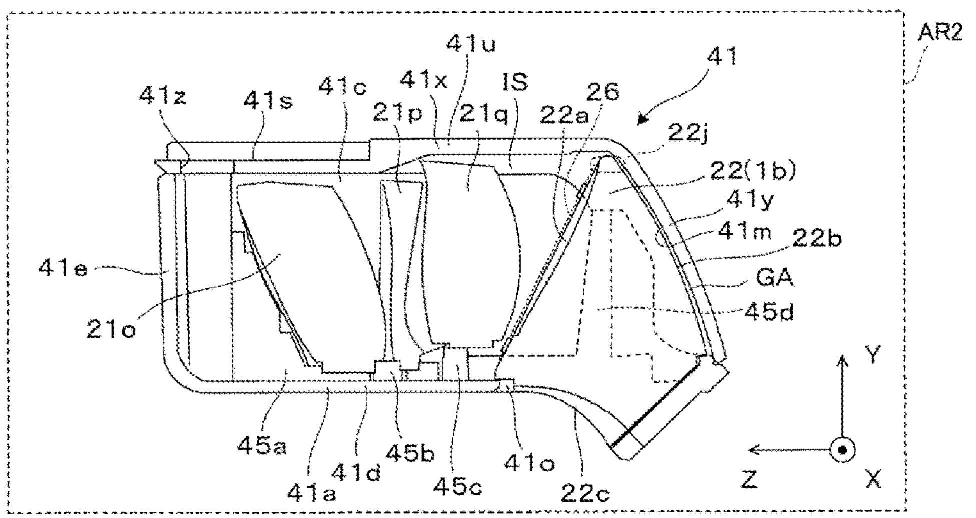
Figure 13:
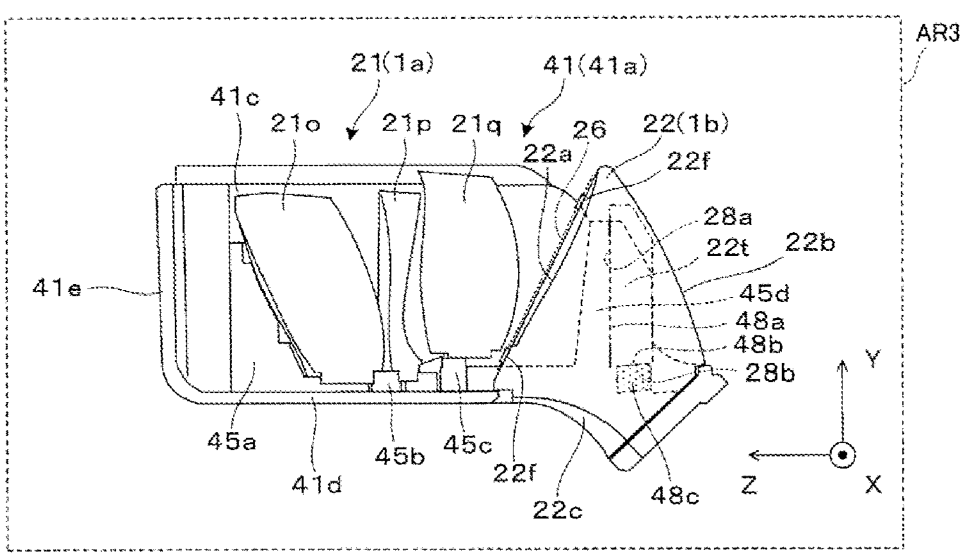

The structure of the barrel 41 will be described with reference to FIGS. 13 and 14. In FIG. 13, a region AR1 is a side cross-sectional view of the barrel 41 and the first display element 11*a* and the optical members 1*a* and 1*b* held by the barrel 41, a region AR2 is a side cross-sectional view of a state in which the first display element 11*a* and the like are excluded, and a region AR3 is a side cross-sectional view of a state in which the barrel cover 41*u* is further excluded. In addition, in FIG. 14, a region BR1 is a rear view of a state in which the barrel cover 41*u* is removed, and a region BR2 is a plan view of a rear end portion in a state in which the barrel cover 41*u* is removed.

The barrel 41 includes a barrel body 41*a* and the barrel cover 41*u*, houses the first optical member 1*a* and holds the second optical member 1*b*. The barrel body 41*a* and the barrel cover 41*u* are made of resins such as polycarbonate resins. The barrel body 41*a* is a bathtub-shaped vessel with an open top, and includes the emission opening 41*o* at a part of a bottom. The barrel cover 41*u* is fixed so as to cover the barrel body 41*a* from above. The barrel body 41*a* includes two side plate members 41*c*, a bottom plate member 41*d*, a front plate member 41*e* and two protruding portions 41*f* and 41*g*. The two side plate members 41*c* extend substantially parallel to the reference plane HS (see FIG. 14) in which the optical axis AX extends and are spaced apart from each other. The bottom plate member 41*d* extends substantially parallel to the XZ plane perpendicular to the reference plane HS in which the optical axis AX extends, and is provided with the emission opening 41*o* on a rear end side. The front plate member 41*e* links a front end of the bottom plate member 41*d* and front ends of the two side plate members 41*c*. The two protruding portions 41*f* and 41*g* extend in a lateral direction so as to protrude outward from upper portions of the two side plate members 41*c*.

At an inside of the side plate member 41*c* on one side, guide convex portions 45*a*, 45*b*, 45*c* and 45*d* each including steps, as protrusions for supporting the first lens 210, the second lens 21*p* and the third lens 21*q* constituting the first optical member 1*a*, and the prism mirror 22 of the second optical member 1*b* are formed. Although not illustrated, guide convex portions similar to the guide convex portions 45*a*, 45*b*, 45*c* and 45*d* are also formed at an inner surface of the side plate member 41*c* on another side (see FIG. 14). The first lens 210 is positioned in a biased state by the two first guide convex portions 45*a* provided at the inner surfaces of the two side plate members 41*c* and is supported by the barrel body 41*a*. Similarly, the second lens 21*p* is positioned by the second guide convex portions 45*b* and supported by the barrel body 41*a*, the third lens 21*q* is positioned by the third guide convex portions 45*c* and supported by the barrel body 41*a*, and the prism mirror 22 is positioned by the fourth guide convex portions 45*d* and supported by the barrel body 41*a*.

The barrel cover 41*u* is disposed on an opposite side of the bottom plate member 41*d* and covers an inside of the barrel body 41*a* to form a housing space IS. The barrel cover 41*u* includes a top plate 41*x* and a rear plate 41*y*. The top plate 41*x* extends parallel to the XZ plane, and the rear plate 41*y* is disposed inclined and covering an outside of the reflection surface 22*b* of the prism mirror 22 of the second optical member 1*b*. In the barrel cover 41*u*, a positioning holder pedestal 41*s* lowered by a predetermined height from a periphery is formed at the front +Z side, and an insertion opening 41*z* is formed in front of the holder pedestal 41*s*. The holder pedestal 41*s* provided at the barrel cover 41*u* faces a base plate 31*b* of the holder 31 for the first display element 11*a*. The base plate 31*b* is fixed to the barrel 41 while covering a part or all of the insertion opening 41*z*. An inner surface 41*m* of the rear plate 41*y* is inclined with respect to the XZ plane and the XY plane, and extends along the reflection surface 22*b* of the prism mirror 22 to the vicinity of the reflection surface 22*b*. A uniform gap GA is formed between the outside of the reflection surface 22*b* and the inner surface 41*m* of the rear plate 41*y*.

The first display element 11*a* illustrated in the region AR1 of FIG. 13 includes a plate-shaped main body portion 11*k* and an FPC portion 11*f* that is coupled to an upper portion of the main body portion 11*k* and extends upward. Among these, the main body portion 11*k* includes a silicon substrate SS at which a drive circuit is formed, a light emission layer 11*e* that is, for example, an organic EL element and that generates the image light ML, and a protective glass GG for sealing that seals the light emission layer 11*e* in cooperation with the silicon substrate SS. Here, the light emission layer 11*e* corresponds to the display surface 11*d* (see FIG. 3).

The holder 31 that supports the first display element 11*a* is a member made of a resin having a light-blocking property, and has an outer shape bent in an L-shape in side view. The holder 31 includes a support frame 31*a* that supports the first display element 11*a*, and a base plate 31*b* that is coupled to the upper portion of the support frame 31*a* and extends in a direction orthogonal to the support frame 31*a*. The support frame 31*a* is inserted into the barrel 41 via the insertion opening 41*z* formed at the barrel 41 while supporting the first display element 11*a*, and is fixed to the holder pedestal 41*s*.

In the barrel 41, the light-blocking member 26 is disposed between the first optical member 1*a* and the second optical member 1*b*. In the case illustrated in the figure, the light-blocking member 26 is disposed at or near the incident transmission surface 22*a* of the prism mirror 22. The light-blocking member 26 is a frame-shaped or a stop-shaped member that transmits the image light ML passing through the non-peripheral edge of the incident transmission surface 22*a*, and is attached in a state of being positioned around the incident transmission surface 22*a*. By disposing the light-blocking member 26 at or near the incident transmission surface 22*a*, it is possible to stably dispose the light-blocking member 26 using the prism mirror 22 while facilitating the incorporation of the light-blocking member 26.

Figure 14:
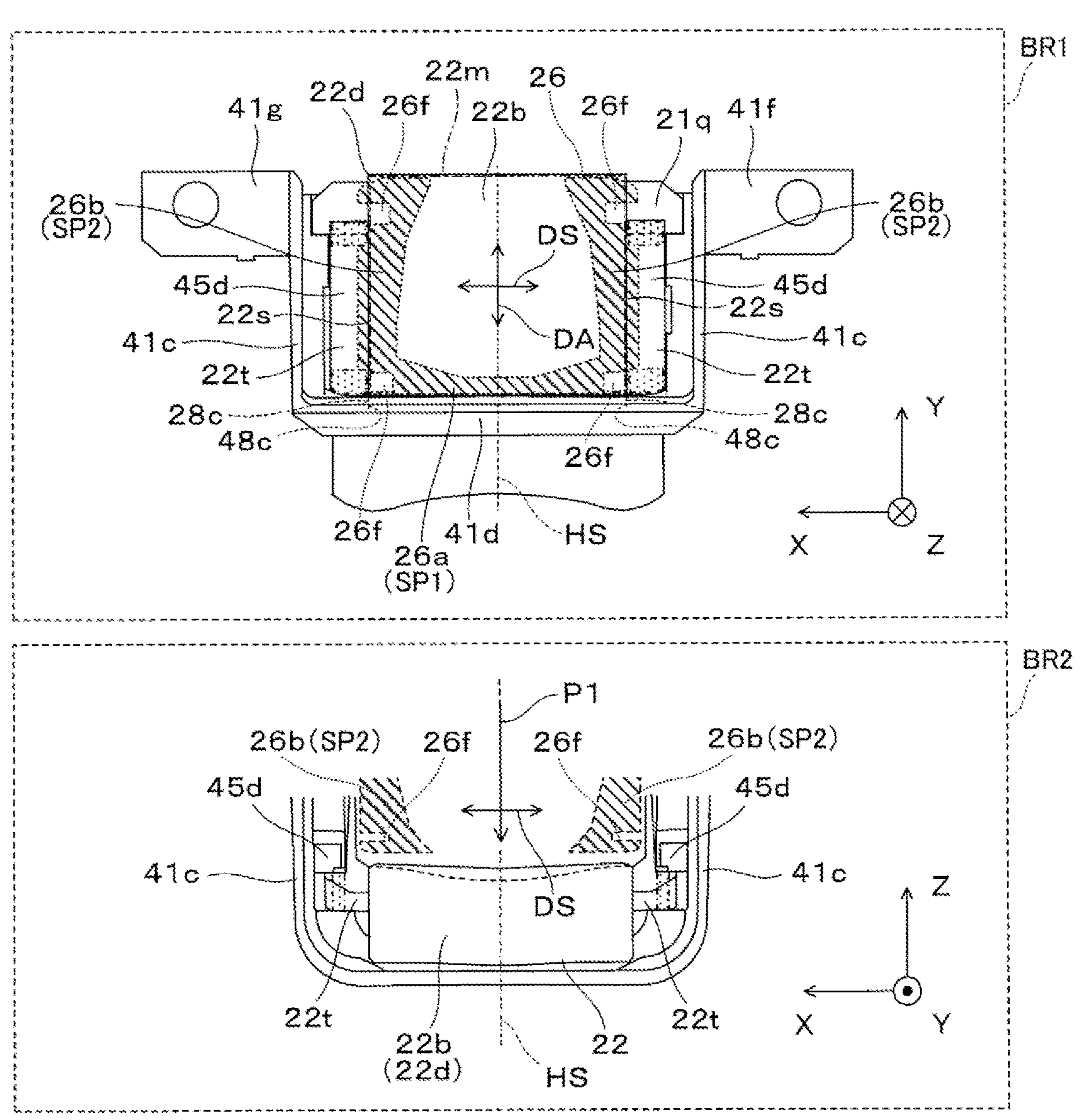
FIG. 14 illustrates a rear view and a plan view of a remaining portion excluding a barrel cover.

Referring to FIG. 14, the light-blocking member 26 includes a central portion 26*a* that is a light-blocking portion disposed at or near the bottom plate member 41*d* of the barrel 41, and two side portions 26*b* that are a pair of light-blocking portions extending from the central portion 26*a* along the two side plate members 41*c*. The central portion 26*a* is a light-blocking portion SP1 facing the optical path portion P1 from one side in an asymmetric direction DA parallel to the reference plane HS in which the optical axis AX extends. The side portions 26*b* are a pair of light-blocking portions SP2 sandwiching the optical path portion P1 in a symmetric direction DS orthogonal to the reference plane HS. That is, the light-blocking member 26 has a shape in which a region facing the optical path portion P1 from the other side in the asymmetric direction DA is opened. In the case of the present embodiment, an optically effective area extends to an upper portion 22*j* of the prism mirror 22. Therefore, the light-blocking member 26 is an open type including the central portion 26*a* corresponding to a lower side and the side portions 26*b* corresponding to left and right sides with an upper side omitted.

The light-blocking member 26 includes notches 26*f* at four positions on a periphery, and the notches 26*f* are fitted to four protrusions 22*f* formed outside the incident transmission surface 22*a* of the prism mirror 22 and on a side surface 22*s* side. Thus, the light-blocking member 26 is positioned with respect to the incident transmission surface 22*a* of the prism mirror 22. The light-blocking member 26 is fixed to the protrusion 22*f* illustrated in FIG. 13 by an adhesive material around the notch 26*f*.

The light-blocking member 26 disposed at or near the incident transmission surface 22*a* of the prism mirror 22 functions to prevent the generation of stray lights. The light-blocking member 26 particularly blocks the passage of the stray lights passing through the −Y side end and the +X side ends of the incident transmission surface 22*a* of the prism mirror 22, that is, the image light ML that does not contribute to the image. In addition, since the +Y side end of the incident transmission surface 22*a* is close to the reflection surface 22*b* or the mirror film 22*m* and the reflection surface 22*b* functions as the optical stop AS and blocks the passage of the image light ML that becomes the stray lights, there is little influence even if the upper side of the light-blocking member 26 is omitted. By omitting the upper side of the light-blocking member 26, the upper end position of the light-blocking member 26 can be lowered, and the increase in the height of the first projection optical system 12*a* in the vertical direction or the Y direction is suppressed, which contributes to the miniaturization of the first projection optical system 12*a*.

The mirror film 22*m* provided as the reflection surface 22*b* of the prism mirror 22 is formed in substantially the same region as that of a base surface 22*d* having the optical surface shape of the prism mirror 22.

Fixing of the second optical member 1*b* or the prism mirror 22 in the barrel 41 will be described. The prism mirror 22 includes protrusions 22*t* at a pair of the side surfaces 22*s* sandwiched by the incident transmission surface 22*a* and the reflection surface 22*b* and the emission transmission surface 22*c*. A pair of first support surfaces 28*a* on the incident transmission surface 22*a* side of the protrusion 22*t* abut on a pair of first placement surfaces 48*a* provided at the guide convex portion 45*d* formed at the barrel body 41*a*. A pair of second support surfaces 28*b* on the emission transmission surface 22*c* side of the protrusion 22*t* abut on a pair of second placement surfaces 48*b* provided at the guide convex portion 45*d* formed at the barrel body 41*a*. A pair of third support surfaces 28*c* facing outward and provided on a lower side of the protrusion 22*t* at the side surface 22*s* abut on an inward facing pair of third placement surfaces 48*c* and provided at the guide convex portion 45*d* formed at the barrel body 41*a*. By using the abutment between the first support surface 28*a* and the first placement surface 48*a*, positioning of the prism mirror 22 with respect to a position in the Z direction and an inclination about the Y-axis and the X-axis is made possible. By using the abutment between the second support surface 28*b* and the second placement surface 48*b*, positioning of the prism mirror 22 with respect to a position in the Y direction and an inclination about the Z-axis is made possible. By using the abutment between the third support surface 28*c* and the third placement surface 48*c*, positioning of the prism mirror 22 with respect to a position in the X direction is made possible. When the prism mirror 22 is assembled to the barrel body 41*a*, the barrel body 41*a* is vertically placed so that the guide convex portion 45*d* or the emission opening 41*o* is on an upper side. Thereafter, an adhesive material is applied to appropriate positions of the first placement surface 48*a*, the second placement surface 48*b* and the third placement surface 48*c* of the guide convex portion 45*d*, and the prism mirror 22 is inserted like a drawer so that the pair of protrusions 22*t* are placed at the pair of guide convex portions 45*d*. The prism mirror 22 can be precisely fixed to the barrel body 41*a* by hardening the adhesive material of each position after the positioning is completed.

Although the method of positioning and fixing the prism mirror 22 to the guide convex portion 45*d* formed at the barrel body 41*a* has been described above, a method of fixing the first lens 210, the second lens 21*p* and the third lens 21*q* to the first guide convex portion 45*a*, the second guide convex portion 45*b* and the third guide convex portion 45*c* is also similar to the case of the prism mirror 22, and description thereof will be omitted. As for an order of assembly, first, the first lens 210 is fixed to the barrel body 41*a*, then the second lens 21*p* is fixed to the barrel body 41*a*, then the third lens 21*q* is fixed to the barrel body 41*a*, and finally the prism mirror 22 is fixed to the barrel body 41*a*.

The method of fixing the prism mirror 22 and the like to the barrel body 41*a* is not limited to the method using the biasing described above, but may be replaced with a method using fitting or other various methods.

The virtual image display device 100 or HMD 200 according to the first embodiment described above includes the first display element 11*a* that is an image light generation device, the first projection optical system 12*a* that projects the image light ML emitted from the first display element 11*a*, and the first combiner 103*a* disposed inclined with respect to the optical path portion P2 of the image light ML emitted from the first projection optical system 12*a* and including the transmissive mirror surface 23*c* that transmits the image light ML, wherein the transmissive mirror surface 23*c* has a curved surface shape with identical sag amounts at effective area ends in vertical and lateral directions that are two directions orthogonal to each other.

In the virtual image display device 100, since the transmissive mirror surface 23*c* has a curved surface shape with identical sag amounts at the effective area ends in the vertical and lateral directions that are two directions orthogonal to each other, it is easy to substantially match the positions of the optical pupils in the vertical and lateral directions that are two directions orthogonal to each other, and it is possible to suppress an increase in the size of the optical elements near the position of the optical pupil of the first projection optical system 12*a*, whereby the entire optical system can be reduced in size and weight. In addition, it is possible to suppress the astigmatic aberration of the transmissive mirror surface 23*c* to be low, and it is not necessary to create astigmatic aberration corresponding to the radius of curvature of the transmissive mirror surface 23*c* on the first projection optical system 12*a* side. Therefore, it is possible to increase the flexibility of optical design and improve the optical performances.

MODIFICATION EXAMPLES AND OTHERS

Although the present disclosure has been described with reference to the above-described embodiments, the present disclosure is not limited to the above-described embodiments and can be implemented in various modes without departing from the spirit of the disclosure. For example, the following modifications are possible.

The light-blocking member 26 can be disposed at various positions without being limited to the vicinity of the incident transmission surface 22*a* of the prism mirror 22.

Figure 15:
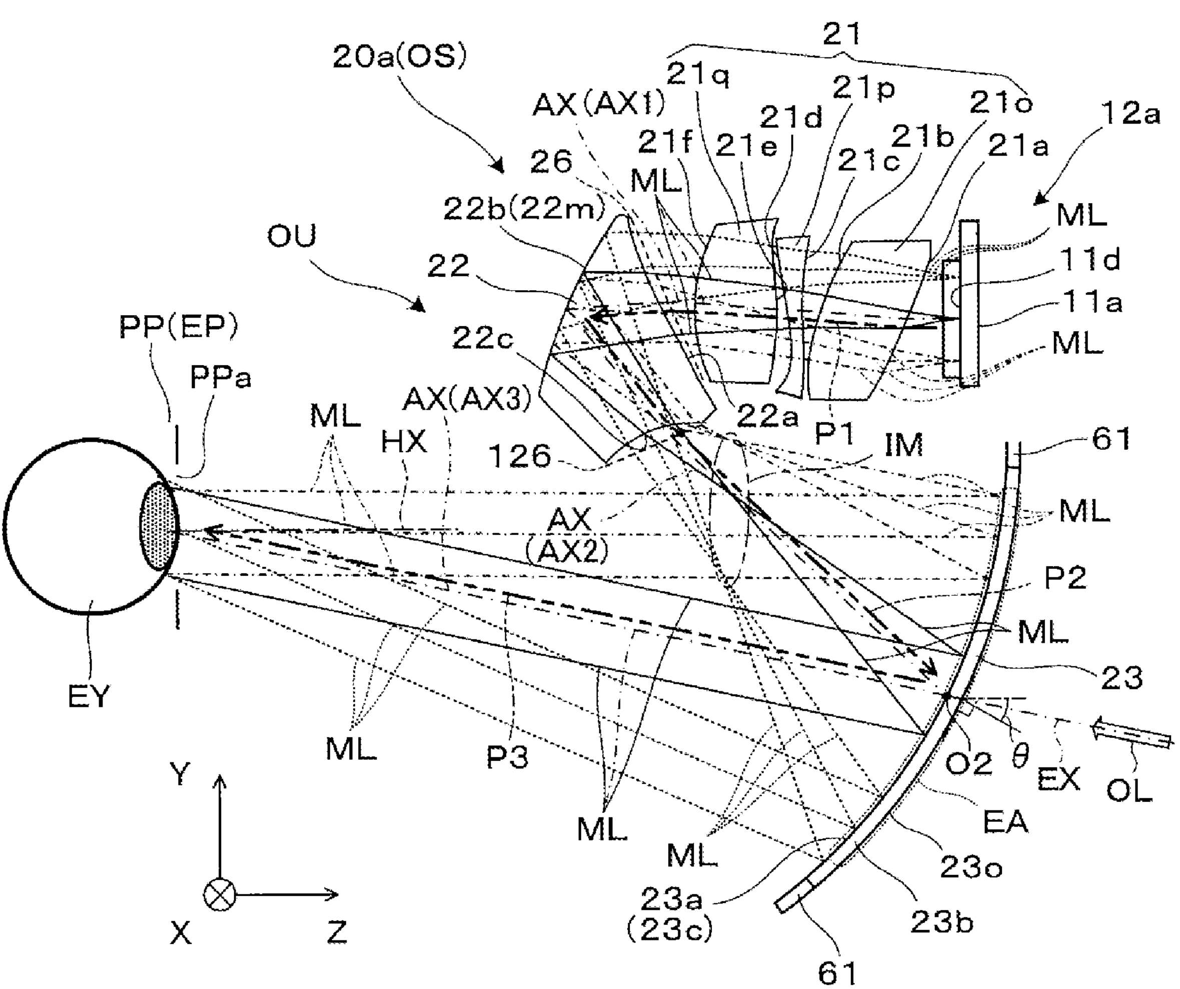
FIG. 15 is a view for explaining a virtual image display device of a modification.

FIG. 15 illustrates an example in which an additional light-blocking member 126 is disposed at the emission transmission surface 22*c* of the prism mirror 22. In the light-blocking member 126, an opening through which the image light ML is transmitted is surrounded and closed.

Although the HMD 200 includes the first display device 100A and the second display device 100B in the above description, the HMD 200 or the virtual image display device 100 may be configured such that the single first display device 100A or second display device 100B is supported in front of the eye by the support device 100C.

The optical members 1*a* and 1*b* of the first projection optical system 12*a* are not limited to those illustrated in the figures. For example, the number of the optical elements constituting the first optical member 1*a* and the shape of the optical surface can be changed as appropriate in accordance with the purpose of use of the HMD 200 and the like.

Although it has been assumed above that the HMD 200 is worn on the head and is used, the virtual image display device 100 may also be used as a handheld display that is not worn on the head and is to be looked into like binoculars. In other words, the head-mounted display also includes a hand-held display in the present disclosure.

A virtual image display device according to a specific aspect includes an image light generation device, a projection optical system configured to project image light emitted from the image light generation device, and a combiner disposed inclined with respect to an optical path of the image light emitted from the projection optical system, the combiner including a transmissive mirror surface configured to transmit the image light, wherein the transmissive mirror surface has a curved surface shape with identical sag amounts at effective area ends in two directions orthogonal to each other. Here, "identical" is not limited to the case of being exactly identical, but also includes the case where there is a minute difference in the sag amounts.

In the head-mounted display device, since the transmissive mirror surface has the curved surface shape with identical sag amounts at the effective area ends in the two orthogonal directions, it is easy to substantially match the positions of the optical pupils in the two orthogonal directions, and it is possible to suppress an increase in the size of the optical elements near the position of the optical pupil of the projection optical system, whereby the entire optical system can be reduced in size and weight. In addition, it is possible to suppress the astigmatic aberration of the transmissive mirror surface to be low, and it is not necessary to create astigmatic aberration corresponding to the radius of curvature of the transmissive mirror surface on the projection optical system side. Therefore, it is possible to increase the flexibility of optical design and improve the optical performances.

In the virtual image display device according to a specific aspect, a difference between the sag amounts in the two directions orthogonal to each other is equal to or less than 1 mm with an optical origin of the combiner as a reference. In this case, the cross-sectional size of the image light can be reduced.

In the virtual image display device according to a specific aspect, the transmissive mirror surface has identical curvature shapes in the two directions orthogonal to each other. In this case, the symmetry of the transmissive mirror surface is enhanced.

In the virtual image display device according to a specific aspect, the transmissive mirror surface is a free form surface.

In the virtual image display device according to a specific aspect, the transmissive mirror surface is a spherical surface or an aspherical surface. In the case of the spherical surface or the aspherical surface, since mold processing of the combiner provided with the transmissive mirror surface becomes easy, it is possible to improve surface accuracy of the transmissive mirror surface, and as a result, it is possible to improve performance of the virtual image display device.

In the virtual image display device according to a specific aspect, the projection optical system includes a projection lens and a prism mirror, and the prism mirror includes two transmission surfaces and a reflection surface. By providing the prism mirror, optical correction can be performed at the transmission surface while bending the optical path, and the performance can be improved while avoiding an increase in the size of the projection optical system or the like.

In the virtual image display device according to a specific aspect, the projection optical system includes an optical surface asymmetric with respect to a decentering direction corresponding to an inclination direction of the combiner. The projection optical system has a function of canceling various aberrations, such as astigmatic aberrations, caused by the decentering of the transmissive mirror surface.

In the virtual image display device according to a specific aspect, in the reflection surface of the prism mirror, a pair of sag amounts at effective area ends in one of two directions orthogonal to each other are equal to each other, and a pair of sag amounts at effective area ends in the other of the two directions are equal to each other.

In the virtual image display device according to a specific aspect, an optical pupil position is disposed in the prism mirror, and the reflection surface functions as an optical stop. When the size of the prism mirror is increased, the weight of the projection optical system tends to be increased. However, since the optical pupil position is disposed in the prism mirror, the size of the incident transmission surface or the emission transmission surface can be reduced, and the size of the prism mirror can be easily reduced. Further, by making the reflection surface function as the optical stop, it is not necessary to secure a space for disposing the stop member, and a support member for fixing the stop member is not necessary, so that it is possible to simplify the structure of the projection optical system.

In the virtual image display device according to a specific aspect, a light-blocking member is disposed at or near an incident transmission surface of the prism mirror. The light-blocking member has a function of preventing generation of stray lights. By disposing the light-blocking member at or near the incident transmission surface of the prism mirror, it is possible to stably dispose the light-blocking member while facilitating the incorporation of the light-blocking member.

In the virtual image display device according to a specific aspect, the light-blocking member includes a pair of light-blocking portions sandwiching the optical path in a symmetrical direction orthogonal to a reference plane including the decentering direction, and a light-blocking portion facing the optical path from one side in an asymmetrical direction parallel to the reference plane, with a region facing the optical path from another side in the asymmetrical direction opened.

In the virtual image display device according to a specific aspect, the projection optical system and the combiner form a virtual image having no distortion with respect to a decentering direction corresponding to an inclination direction of the combiner with an image formed at the image light generation device as a reference. As a result, it is possible to reduce the amount of calculation processing at the time of image processing and reduce the circuit load.

An optical unit according to a specific aspect includes a projection optical system configured to project image light emitted from an image light generation device, and a combiner disposed inclined with respect to an optical path of the image light emitted from the projection optical system, the combiner including a transmissive mirror surface configured to transmit the image light, wherein the transmissive mirror surface has a curved surface shape with identical sag amounts at effective area ends in two directions orthogonal to each other.

In the optical unit, since the transmissive mirror surface has the curved surface shape with identical sag amounts at the effective area ends in the two orthogonal directions, it is easy to substantially match the positions of the optical pupils in the two orthogonal directions, and it is possible to suppress an increase in the size of the optical elements near the position of the optical pupil of the projection optical system, whereby the entire optical system can be reduced in size and weight. In addition, it is possible to suppress the astigmatic aberration of the transmissive mirror surface to be low, and it is not necessary to create astigmatic aberration corresponding to the radius of curvature of the transmissive mirror surface on the projection optical system side. Therefore, it is possible to increase the flexibility of optical design and improve the optical performances.

What is claimed is:

1. A virtual image display device comprising:

an image light generation device;

a projection optical system configured to project image light emitted from the image light generation device; and a combiner disposed inclined with respect to an optical path of the image light emitted from the projection optical system, the combiner including a transmissive mirror surface configured to transmit the image light, wherein the transmissive mirror surface has a curved surface shape with identical sag amounts at effective area ends in two directions orthogonal to each other, the projection optical system includes a prism mirror having a reflection surface, and in the reflection surface of the prism mirror, a pair of sag amounts at effective area ends in one of two intersecting directions are equal to each other, and a pair of sag amounts at effective area ends in the other of the two intersecting directions are equal to each other.

2. The virtual image display device according to claim 1, wherein a difference between the sag amounts in the two directions orthogonal to each other is equal to or less than 1 mm with an optical origin of the combiner as a reference.

3. The virtual image display device according to claim 1, wherein the transmissive mirror surface has identical curvature shapes in the two directions orthogonal to each other.

4. The virtual image display device according to claim 3, wherein the transmissive mirror surface is a free form surface.

5. The virtual image display device according to claim 3, wherein the transmissive mirror surface is a spherical surface or an aspherical surface.

6. The virtual image display device according to claim 1, wherein the projection optical system includes a projection lens, and the prism mirror includes two transmission surfaces.

7. The virtual image display device according to claim 6, wherein the projection optical system includes an optical surface asymmetric with respect to a decentering direction corresponding to an inclination direction of the combiner.

8. The virtual image display device according to claim 6, wherein an optical pupil position is disposed in the prism mirror and the reflection surface functions as an optical stop.

9. The virtual image display device according to claim 8, wherein a light-blocking member is disposed at or near an incident transmission surface of the prism mirror.

10. The virtual image display device according to claim 9, wherein the light-blocking member includes a pair of light-blocking portions sandwiching the optical path in a symmetrical direction orthogonal to a reference plane including a decentering direction corresponding to an inclination direction of the combiner, and a light-blocking portion facing the optical path from one side in an asymmetrical direction parallel to the reference plane, with a region facing the optical path from another side in the asymmetrical direction opened.

11. The virtual image display device according to claim 1, wherein the projection optical system and the combiner form a virtual image having no distortion with respect to a decentering direction corresponding to an inclination direction of the combiner with an image formed at the image light generation device as a reference.

12. An optical unit comprising:

a projection optical system configured to project image light emitted from an image light generation device; and a combiner disposed inclined with respect to an optical path of the image light emitted from the projection optical system, the combiner including a transmissive mirror surface configured to transmit the image light, wherein the transmissive mirror surface has a curved surface shape with identical sag amounts at effective area ends in two directions orthogonal to each other, the projection optical system includes a prism mirror having a reflection surface, and in the reflection surface of the prism mirror, a pair of sag amounts at effective area ends in one of two intersecting directions are equal to each other, and a pair of sag amounts at effective area ends in the other of the two intersecting directions are equal to each other.

* * * * *